(12) United States Patent
Yoshimura et al.

(10) Patent No.: US 6,472,495 B1
(45) Date of Patent: *Oct. 29, 2002

(54) COMPOSITION FOR PRODUCING RESIN

(75) Inventors: Yuichi Yoshimura, Chiba-ken; Motoharu Takeuchi; Atsuki Niimi, both of Tokyo; Hiroshi Horikoshi, Chiba-ken, all of (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/708,565

(22) Filed: Nov. 9, 2000

(30) Foreign Application Priority Data

Nov. 9, 1999 (JP) .............................. 11-318960

(51) Int. Cl.$^7$ .............................................. C08G 18/52
(52) U.S. Cl. ........................... 528/73; 528/75; 351/159
(58) Field of Search ...................... 528/73, 75; 351/159

(56) References Cited

U.S. PATENT DOCUMENTS

| | | | |
|---|---|---|---|
| 4,689,387 A | | 8/1987 | Kajimoto et al. |
| 5,294,666 A | | 3/1994 | Okada et al. |
| 5,807,975 A | | 9/1998 | Amagai et al. |
| 5,945,504 A | | 8/1999 | Amagai et al. |
| 5,973,098 A | * | 10/1999 | Keita et al. |
| 6,117,923 A | | 9/2000 | Amagai et al. |
| 6,130,307 A | * | 10/2000 | Amagai et al. |
| 2001/0030734 A1 | * | 10/2001 | Kosaka |

FOREIGN PATENT DOCUMENTS

| | | |
|---|---|---|
| EP | 0374258 | 6/1990 |
| EP | 0921417 | 6/1999 |
| JP | 1-98615 | 4/1989 |
| JP | 3-81320 | 4/1991 |
| JP | 4-58489 | 9/1992 |
| JP | 411352302 | * 12/1999 |

* cited by examiner

*Primary Examiner*—Rachel Gorr
(74) *Attorney, Agent, or Firm*—Antonelli, Terry, Stout & Kraus, LLP

(57) ABSTRACT

A composition comprising (a) 30 to 95% by weight of a compound having, in one molecule, one or more structures represented by the following formula (1):

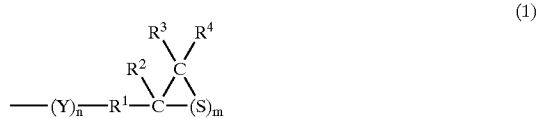

(1)

wherein $R^1$ is a single bond or a divalent hydrocarbon group having 1 to 10 carbon atoms, $R^2$, $R^3$ and $R^4$ are each hydrogen or a hydrocarbon group having 1 to 10 carbon atoms, Y is O, S, Se or Te, m is an integer of 1 to 5 and n is an integer of 0 to 5; (b) 1 to 40% by weight of a compound having at least one group selected from the group consisting of isocyanate group and isothiocyanate group in one molecule; and (c) 1 to 50% by weight of a compound having at least one mercapto group in one molecule. A resin produced by curing the composition by polymerization has an excellent impact resistance and optical properties, and is suitable as an optical material.

12 Claims, No Drawings

COMPOSITION FOR PRODUCING RESIN

BACKGROUND OF THE INVENTION

1. Field of the Invention

The present invention relates to a composition for producing resins. The resin produced from the composition of the present invention is advantageously used as optical materials for plastic lenses, prisms, optical fibers, substrates of information recording media and filters, particularly as a material for plastic spectacle lenses.

2. Description of the Prior Art

Plastic materials have been widely used in various optical applications, particularly in manufacturing spectacle lenses, because of their light weight, toughness and easiness of dyeing. Optical products, particularly spectacle lenses are required to have, in addition to a low specific gravity, optical properties such as a high refractive index and a large Abbe's number and physical properties such as high heat resistance and large mechanical strength. A large refractive index can decrease thickness of a lens. A large Abbe's number is important to avoid chromatic aberration of a lens. A high heat resistance and a large mechanical strength are important to facilitate fabrication and also for safety.

As high refractive index materials, thermosetting optical materials having a thiourethane structure derived from the reaction of a polythiol compound and a polyisocyanate compound have been proposed in Japanese Patent Publication No. 458489 and U.S. Pat. No. 5,294,666. Japanese Patent Application Laid-Open Nos. 1-98615 and 3-81320 and EP-A-0374258 disclose the production of lenses by polymerization of an epoxy resin or an episulfide resin with a multi-functional compound. Nevertheless, higher refractive index is still demanded. A small chromatic aberration is another important property required for optical materials. The larger the Abbe's number, the smaller the chromatic aberration. Therefore, a material having a large Abbe's number is desired. Thus, a material simultaneously satisfying high refractive index and large Abbe's number is demanded.

However, the Abbe's number tends to decrease with increase in the refractive index. Plastic materials made of known compounds have the maximum Abbe's number of about 50 to 55 when the refractive index is 1.50 to 1.55, about 40 when the refractive index is 1.60 and about 31 when the refractive index is 1.66. When tried to achieve a refractive index of 1.70 or higher, no optical material suitable for practical use was obtained because the Abbe's number was as small as 30 or less.

In addition, known thiourethane materials require to increase the molecular weight of the starting sulfur compound for achieving a high refractive index, this decreasing crosslinking density. In contrast, the content of alkyl groups should be increased to achieve a large Abbe's number, this decreasing the rigidity of molecules of the starting compounds to result in drawbacks such as poor heat resistance. Namely, there is a limit to known optical materials obtained from episulfide compounds, polythiol compounds and isocyanate compounds in achieving a high refractive index. Moreover, an increase in the refractive index decreases the Abbe's number. Therefore, known optical materials cannot achieve simultaneous satisfaction of high refractive index and large Abbe's number.

To solve the above problems, the inventors found novel sulfur-containing compounds which were capable of providing thin optical materials with small chromatic aberration (U.S. Pat. Nos. 5,807,975 and 5,945,504). The inventors further found resin compositions which improved the oxidation resistance and dyeability of optical materials obtained by curing the above sulfur-containing compounds by polymerization (U.S. Pat. No. 6,117,923 and European Patent Application EP 0 921 417). However, optical materials obtained from these compositions are still insufficient in impact resistance. A small impact resistance requires a thickness large enough to practical use. This prevents the reduction in the thickness and weight, although the high refractive index of the optical materials has enabled to reducing the thickness.

SUMMARY OF THE INVENTION

An object of the present invention is to improve the impact resistance of a resin obtained by curing sulfur-containing compounds by polymerization.

After extensive study in view of the above object, the inventors have found that the object can be achieved by a resin obtained by curing a composition by polymerization, which composition comprises (a) 30 to 95% by weight of a compound having, in one molecule, one or more structures represented by the following formula (1):

wherein $R^1$ is a single bond or a divalent hydrocarbon group having 1 to 10 carbon atoms, $R^2$, $R^3$ and $R^4$ are each hydrogen or a hydrocarbon group having 1 to 10 carbon atoms, Y is O, S, Se or Te, m is an integer of 1 to 5 and n is an integer of 0 to 5; (b) 1 to 40% by weight of a compound having at least one group selected from the group consisting of isocyanate group and isothiocyanate group in one molecule; and (c) 1 to 50% by weight of a compound having at least one mercapto group in one molecule.

DETAILED DESCRIPTION OF THE INVENTION

In the composition of the present invention, the amount ratio of the compound (a), compound (b) and compound (c) is not strictly limited because it depends on the refractive index and viscosity of the respective compounds and the intended physical properties of the obtained resin, and preferably 30 to 95% by weight for the compound (a), 1 to 40% by weight for the compound (b) and 1 to 50% by weight for the compound (c). The amount ratios outside the above ranges result in failure to obtain the high impact resistance which is the object of the present invention. Other drawbacks are poor heat resistance, deterioration of color tone of the cured product and failure in simultaneous satisfaction of a high refractive index and a large Abbe's number. More preferred ranges are 50 to 95% by weight for the compound (a), 1 to 25% by weight for the compound (b) and 1 to 35% by weight for the compound (c). Particularly preferred ranges are 60 to 90% by weight for the compound (a), 3 to 15% by weight for the compound (b) and 5 to 25% by weight for the compound (c). The weight percentages of the compounds (a), (b) and (c) are suitably selected from the above respective ranges so that the total of the weight percentages of the compounds (a), (b) and (c) adds up to 100% by weight.

To further improve the impact resistance of the resin obtained by curing the composition by polymerization, it is preferable that the compound (a) has at least two structures represented by the formula (1) in one molecule, the compound (b) has at least two groups selected from the group consisting of isocyanate group and isothiocyanate group in one molecule and the compound (c) has at least two mercapto groups in one molecule.

To obtain a high refractive index, in the formula (1), $R^1$ is preferably a hydrocarbon group having 0 to 2 carbon atoms and $R^2$, $R^3$ and $R^4$ are each preferably hydrogen atom or methyl group. More preferably, $R^1$ is a hydrocarbon group having 0 to 1 carbon atom and $R^2$, $R^3$ and $R^4$ are each hydrogen atom. It is preferable that the compound (c) has a sulfur atom in addition to the sulfur atom in the mercapto group and more preferably has a sulfide linkage.

Examples of the compound (a) are listed below while classified into the groups (A) to (E):

(A) Compounds (a) having in one molecule at least one structure represented by the formula (1) wherein n is 0;
(B) Compounds (a) having in one molecule at least one structure represented by the formula (1) wherein Y is O;
(C) Compounds (a) having in one molecule at least one structure represented by the formula (1) wherein Y is S;
(D) Compounds (a) having in one molecule at least one structure represented by the formula (1) wherein Y is Se; and
(E) Compounds (a) having in one molecule at least one structure represented by the formula (1) wherein Y is Te.

The group (A) to (E) compounds has a backbone structure derived from a chain compound, a branched compound, an alicyclic compound, an aromatic compound or a heterocyclic compound having nitrogen, oxygen, sulfur, selenium or tellurium as the heteroatom. The compounds may have a plurality of the above structures in one molecule. The compounds may also have a sulfide linkage, a selenide linkage, a telluride linkage, an ether linkage, a sulfone linkage, a ketone linkage, an ester linkage, an amide linkage or a urethane linkage in the molecule.

Examples of the group (A) compound include:

Organic compounds having a chain aliphatic backbone structure such as 1,1-bis(epithioethyl)methane, 1,1-bis(epidithioethyl)methane, 1-(epithioethyl)-1-(β-epithiopropyl)-methane, 1,1-bis(β-epithiopropyl)methane, 1-(epithioethyl)-1-(β-epithiopropyl)ethane, 1,2-bis(β-epithiopropyl)ethane, 1,2-bis(β-epidithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutylthio)ethane, 1-(epithioethyl)-2-[2-(γ-epithiobutylthio)ethylthio]ethane, tetrakis(β-epithiopropyl)methane, 1,1,1-tris(β-epithiopropyl)propane, 1,3-bis(β-epithiopropyl)-1-(β-epithiopropyl)-2-thiapropane and 1,5-bis(β-epithiopropyl)-2,4-bis(β-epithiopropyl)-3-thiapentane;

Compounds having an alicyclic backbone structure such as 1,3-bis(epithioethyl)cyclohexane, 1,4-bis(epithioethyl)cyclohexane, 1,3-bis(β-epithiopropyl)cyclohexane, 1,4-bis(β-epithiopropyl)cycdohexane, bis[4-(epithioethyl)cyclohexyl]methane, bis[4-(β-epithiopropyl)cyclohexyl]methane, 2,2-bis[4-(epithioethyl)cyclohexyl]propane, 2,2-bis[4-(β-epithiopropyl)cyclohexyl]propane, bis[4-(β-epithiopropyl)cyclohexyl]sulfide, bis[4-(epithioethyl)cyclohexyl]sulfide, 2,5-bis(epithioethyl)-1,4-dithiane, 2,5-bis(β-epithiopropyl)-1,4-dithiane, 4-epithioethyl-1,2-cyclohexene sulfide, 4-epoxy-1,2-cyclohexene sulfide, 2,3-bis(1,2-epithioethyl)-1,4-diselenane, 2,5-bis(1,2-epithioethyl)-1,4-diselenane, 2,6-bis(1,2-epithioethyl)-1,4-diselenane, 2,3-bis(2,3-epithiopropyl)-1,4-diselenane, 2,5-bis(2,3-epithiopropyl)-1,4-diselenane, 2,6-bis(2,3-epithiopropyl)-1,4-diselenane, 2,4-bis(1,2-epithioethyl-1,3-diselenane, 2,5-bis(1,2-epithioethyl)-1,3-diselenane, 2,6-bis(1,2-epithioethyl)-1,3-diselenane, 2,4-bis(2,4-epithiopropyl)-1,3-diselenane, 2,5-bis(2,4-epithiopropyl)-1,3-diselenane, 2,6-bis(2,4-epithiopropyl)-1,3-diselenane, 2,3-bis(1,2-epithioethyl)-1-thia-4-selenane, 2,5-bis(1,2-epithioethyl)-1-thia-4-selenane, 2,6-bis(1,2-epithioethyl)-1-thia-4-selenane, 3,5-bis(1,2-epithioethyl)-1-thia-4-selenane, 2,3-bis(2,3-epithiopropyl)-1-thia-4-selenane, 2,5-bis(2,3-epithiopropyl)-1-thia-4-selenane, 2,6-bis(2,3-epithiopropyl)-1-thia-4-selenane, 3,5-bis(2,3-epithiopropyl)-1-thia-4-selenane, 2,4-bis(1,2-epithioethyl)-1,3-diselenolane, 4,5-bis(1,2-epithioethyl)-1,3-diselenolane, 2,4-bis(2,4-epithiopropyl)-1,3-diselenolane, 4,5-bis(2,4-epithiopropyl)-1,3-diselenolane, 2,4-bis(1,2-epithioethyl)-1-thia-3-selenolane, 2,5-bis(1,2-epithioethyl)-1-thia-3-selenolane, 4,5-bis(1,2-epithioethyl)-1-thia-3-selenolane, 2,4-bis(2,4-epithiopropyl)-1-thia-3-selenolane, 2,5-bis(2,4-epithiopropyl)-1-thia-3-selenolane, 4,5-bis(2,4-epithiopropyl)-1-thia-3-selenolane, 2,3-bis(1,2-epithioethyl)selenophane, 2,4-bis(1,2-epithioethyl)selenophane, 2,5-bis(1,2-epithioethyl)selenophane, 3,4-bis(1,2-epithioethyl)selenophane, 2,3-bis(2,3-epithiopropyl)selenophane, 2,4-bis(2,3-epithiopropyl)selenophane, 2,5-bis(2,3-epithiopropyl)selenophane, 3,4-bis(2,3-epithiopropyl)selenophane, 2,3-bis(1,2-epithioethyl)-1,4-ditellurane, 2,5-bis(1,2-epithioethyl)-1,4-ditellurane, 2,6-bis(1,2-epithioethyl)-1,4-ditellurane, 2,3-bis(2,3-epithiopropyl)-1,4-ditellurane, 2,5-bis(2,3-epithiopropyl)-1,4-ditellurane, 2,6-bis(2,3-epithiopropyl)-1,4-ditellurane, 2,4-bis(1,2-epithioethyl)-1,3-ditellurane, 2,5-bis(1,2-epithioethyl)-1,3-ditellurane, 2,6-bis(1,2-epithioethyl)-1,3-ditellurane, 2,4-bis(2,4-epithiopropyl)-1,3-ditellurane, 2,5-bis(2,4-epithiopropyl)-1,3-ditellurane, 2,6-bis(2,4-epithiopropyl)-1,3-ditellurane, 2,3-bis(1,2-epithioethyl)-1-thia-4-tellurane, 2,5-bis(1,2-epithioethyl)-1-thia-4-tellurane, 2,6-bis(1,2-epithioethyl)-1-thia-4-tellurane, 3,5-bis(1,2-epithioethyl)-1-thia-4-tellurane, 2,3-bis(2,3-epithiopropyl)-1-thia-4-tellurane, 2,5-bis(2,3-epithiopropyl)-1-thia-4-tellurane, 2,6-bis(2,3-epithiopropyl)-1-thia-4-tellurane, 3,5-bis(2,3-epithiopropyl)-1-thia-4-tellurane, 2,4-bis(1,2-epithioethyl)-1,3-ditellurolane, 4,5-bis(1,2-epithioethyl)-1,3-ditellurolane, 2,4-bis(2,4-epithiopropyl)-1,3-ditellurolane, 4,5-bis(2,4-epithiopropyl)-1,3-ditellurolane, 2,4-bis(1,2-epithioethyl)-1-thia-3-tellurolane, 2,5-bis(1,2-epithioethyl)-1-thia-3-tellurolane, 4,5-bis(1,2-epithioethyl)-1-thia-3-tellurolane, 2,4-bis(2,4-epithiopropyl)-1-thia-3-tellurolane, 2,5-bis(2,4-epithiopropyl)-1-thia-3-tellurolane, 4,5-bis(2,4-epithiopropyl)-1-thia-3-tellurolane, 2,3-bis(1,2- epithioethyl)tellurophane, 2,4-bis(1,2-epithioethyl) tellurophane, 2,5-bis(1,2-epithioethyl)tellurophane, 3,4-bis(1,2-epithioethyl)tellurophane, 2,3-bis(2,3-epithiopropyl)tellurophane, 2,4-bis(2,3-epithiopropyl) tellurophane, 2,5-bis(2,3-epithiopropyl)tellurophane and 3,4-bis(2,3-epithiopropyl)tellurophane;

Compounds having an aromatic backbone structure such as 1,3-bis(epithioethyl)benzene, 1,4-bis(epithioethyl) benzene, 1,3-bis($\beta$-epithiopropyl)benzene, 1,4-bis($\beta$-epithiopropyl)benzene, bis[4-(epithioethyl)phenyl] methane, bis[4-($\beta$-epithiopropyl)phenyl]methane, 2,2-bis[4-(epithioethyl)phenyl]propane, 2,2-bis[4-($\beta$-epithiopropyl)phenyl]propane, bis[4-(epithioethyl) phenyl]sulfide, bis[4-($\beta$-epithiopropyl)phenyl]sulfide, bis[4-(epithioethyl)phenyl]sulfone, bis[4-($\beta$-epithiopropyl)phenyl]sulfone, 4,4'-bis(epithioethyl) biphenyl, and 4,4'-bis($\beta$-epithiopropyl)biphenyl; and Compounds obtained by replacing at least one hydrogen of the epithio group in the above compounds with methyl.

Examples of the group (B) compound include:

Compounds having a chain aliphatic backbone structure such as bis($\beta$-epithiopropyl) ether, bis($\beta$-epidithiopropyl)ether, bis($\beta$-epithiopropyloxy) methane, 1,2-bis($\beta$-epithiopropyloxy)ethane, 1,3-bis($\beta$-epithiopropyloxy)propane, 1,2-bis($\beta$-epithiopropyloxy)propane, 1-($\beta$-epithiopropyloxy)-2-($\beta$-epithiopropyloxymethyl)propane, 1,4-bis($\beta$-epithiopropyloxy)butane, 1,3-bis($\beta$-epithiopropyloxy) butane, 1-($\beta$-epithiopropyloxy)-3-($\beta$-epithiopropyloxymethyl)butane, 1,5-bis($\beta$-epithiopropyloxy)pentane, 1-($\beta$-epithiopropyloxy)-4-($\beta$-epithiopropyloxymethyl)pentane, 1,6-bis($\beta$-epithiopropyloxy)hexane, bis(epithioethyl)ether, 1-($\beta$-epithiopropyloxy)-5-($\beta$-epithiopropyloxymethyl) hexane, 1-($\beta$-epithiopropyloxy)-2-[(2-epithiopropyloxyethyl)oxy]ethane, 1-($\beta$-epithiopropyloxy)-2-[[2-(2,-epithiopropyloxyethyl) oxyethyl]oxy]ethane, bis(5,6-epithio-3-oxahexyl) selenide, bis(5,6-epithio-3-oxahexyl)telluride, tetrakis($\beta$-epithiopropyloxymethyl)methane, 1,1,1-tris($\beta$-epithiopropyloxymethyl)propane, 1,5-bis($\beta$-epithiopropyloxy)-2-($\beta$-epithiopropyloxymethyl)-3-thiapentane, 1,5-bis($\beta$-epithiopropyloxy)-2,4-bis($\beta$-epithiopropyloxymethyl)-3-thiapentane, 1-($\beta$-epithiopropyloxy)-2,2-bis($\beta$-epithiopropyloxymethyl)-4-thiahexane, 1,5,6-tris($\beta$-epitbiopropyloxy)-4-($\beta$-epithiopropyloxymethyl)-3-thiahexane, 1,8-bis($\beta$-epithiopropyloxy)-4-($\beta$-epithiopropyloxymethyl)-3,6-dithiaoctane, 1,8-bis($\beta$-epithiopropyloxy)-4,5-bis($\beta$-epithiopropyloxymethyl)-3,6-dithiaoctane, 1,8-bis($\beta$-epithiopropyloxy)-4,4-bis($\beta$-epithiopropyloxymethyl)-3,6-dithiaoctane, 1,8-bis($\beta$-epithiopropyloxy)-2,4,5-tris($\beta$-epithiopropyloxymethyl)-3,6-dithiaoctane, 1,8-bis($\beta$-epithiopropyloxy)-2,5-bis($\beta$-epithiopropyloxymethyl)-3,6-dithiaoctane, 1,9-bis($\beta$-epithiopropyloxy)-5-($\beta$-epithiopropyloxymethyl)-5-[(2-($\beta$-epithiopropyloxyethyl)oxymethyl]-3,7-dithianonane, 1,10-bis($\beta$-epithiopropyloxy)-5,6-bis[(2-$\beta$-epithiopropyloxyethyl)oxy]-3,6,9-trithiadecane, 1,11-bis($\beta$-epithiopropyloxy)-4,8-bis($\beta$-epithiopropyloxymethyl)-3,6,9-trithiaundecane, 1,11-bis($\beta$-epithiopropyloxy)-5,7-bis($\beta$-epithiopropyloxymethyl)-3,6,9-trithiaundecane, 1,11-bis($\beta$-epitbiopropyloxy)-5,7-[(2-($\beta$-epithiopropyloxyethyl)oxymethyl]-3,6,9-trithiaundecane and 1,11-bis($\beta$-epithiopropyloxy)-4,7-bis($\beta$-epithiopropyloxymethyl)-3,6,9-trithiaundecane;

Compounds having an alicyclic backbone structure such as 1,3-bis($\beta$-epithiopropyloxy)cyclohexane, 1,4-bis($\beta$-epithiopropyloxy)cyclohexane, 1,3-bis($\beta$-epithiopropyloxymethyl)cyclohexane, 1,4-bis($\beta$-epithiopropyloxymethyl)cyclohexane, bis[4-($\beta$-epithiopropyloxy)-cyclohexyl]methane, 2,2-bis[4-($\beta$-epithiopropyloxy)cyclohexyl]propane, bis[4-($\beta$-epithiopropyloxy)cyclohexyl]sulfide, 2,5-bis($\beta$-epithiopropyloxymethyl)-1,4-dithiane, 2,5-bis($\beta$-epithiopropyloxyethyloxymethyl)-1,4-dithiane, 2,4-bis(3,4-epithio-1-oxabutyl)-1,3-diselenolane, 4,5-bis(3,4-epithio-1-oxabutyl)-1,3-diselenolane, 4,5-bis(4,5-epithio-2-oxapentyl)-1,3-diselenolane, 2,4-bis(4,5-epithio-2-oxapentyl)-1,3-diselenolane, 2,4-bis(3,4-epithio-1-oxabutyl)-1-thia-3-selenolane, 2,5-bis(3,4-epithio-1-oxabutyl)-1-thia-3-selenolane, 4,5-bis(3,4-epithio-1-oxabutyl)-1-thia-3-selenolane, 2,4-bis(4,5-epithio-2-oxapentyl)-1-thia-3-selenolane, 2,5-bis(4,5-epithio-2-oxapentyl)-1-thia-3-selenolane, 4,5-bis(4,5-epithio-2-oxapentyl)-1-thia-3-selenolane, bis(3,4-epithio-1-oxabutyl)tricycloselenaoctane, bis(3,4-epithio-1-oxabutyl)dicycloselenanonane, 2,3-bis(3,4-epithio-1-oxabutyl)selenophane, 2,4-bis(3,4-epithio-1-oxabutyl)selenophane, 2,5-bis(3,4-epithio-1-oxabutyl) selenophane, 3,4-bis(3,4-epithio-1-oxabutyl) selenophane, 2,3-bis(4,5-epithio-2-oxapentyl) selenophane, 2,4-bis(4,5-epithio-2-oxapenty) selenophane, 2,5-bis(4,5-epithio-2-oxapentyl)-selenophane, 3,4-bis(4,5-epithio-2-oxapentyl) selenophane, 2,3-bis(3,4-epithio-1-oxabutyl)-1,4-diselenane, 2,5-bis(3,4-epithio-1-oxabutyl)-1,4-diselenane, 2,6-bis(3,4-epithio-1-oxabutyl)-1,4-diselenane, 2,3-bis(4,5-epithio-2-oxapentyl)-1,4-diselenane, 2,5-bis(4,5-epithio-2-oxapentyl)-1,4-diselenane, 2,6-bis(4,5-epithio-2-oxapenyyl)-1,4-diselenane, 2,4-bis(3,4-epithio-1-oxabutyl)-1,3-diselenane, 2,5-bis(3,4-epithio-1-oxabutyl)-1,3-diselenane, 2,6-bis(3,4-epithio-1-oxabutyl)-1,3-diselenane, 2,4-bis(4,5-epithio-2-oxapentyl)-1,3-diselenane, 2,5-bis(4,5-epthio-2-oxapentyl)-1,3-diselenane, 2,6-bis(4,5-epithio-2-oxapentyl)-1,3-diselenane, 2,3-bis(3,4-epithio-1-oxabutyl)-1-thia-4-selenane, 2,5-bis(3,4-epithio-1-oxabutyl)-1-thia-4-selenane, 2,6-bis(3,4-epithio-1-oxabutyl)-1-thia-4-selenane, 3,5-bis(3,4-epithio-1-oxabutyl)-1-thia-4-selenane, 2,3-bis(4,5-epithio-2-oxapentyl)-1-thia-4-selenane, 2,5-bis(4,5-epithio-2-oxapentyl)-1-thia-4-selenane, 2,6-bis(4,5-epithio-2-oxapentyl)-1-thia-4-selenane, 3,5-bis(4,5-epithio-2-oxapentyl)-1-thia-4-selenane, 2,4-bis(3,4-epithio-1-oxabutyl)-1,3-ditellurolane, 4,5-bis(3,4-epithio-1-oxabutyl)-1,3-ditellurolane, 2,4-bis(4,5-epithio-2-oxapentyl)-1,3-ditellurolane, 4,5-bis(4,5-epithio-2-oxapentyl)-1,3-ditellurolane, 2,4-bis(3,4-epithio-1-oxabutyl)-1-thia-3-tellurolane, 2,5-bis(3,4-epithio-1-oxabutyl)-1-thia-3-tellurolane, 4,5-bis(3,4-epithio-1-oxabutyl)-1-thia-3-tellurolane, 2,4-bis(4,5-epithio-2-oxapentyl)-1-thia-3-tellurolane, 2,5-bis(4,5-epithio-2-oxapentyl)-1-thia-3-tellurolane, 4,5-bis(4,5-epithio-2-oxapentyl)-1-thia-3-tellurolane, bis(3,4-epithio-1-oxabutyl) tricyclotelluraoctane, bis(3,4-epithio-1-oxabutyl) dicyclotelluranonane, 2,3-bis(3,4-epithio-1-oxabutyl) tellurophane, 2,4-bis(3,4-epithio-1-oxabutyl) tellurophane, 2,5-bis(3,4-epithio-1-oxabutyl) tellurophane, 3,4-bis(3,4-epithio-1-oxabutyl) tellurophane, 2,3-bis(4,5-epithio-2-oxapentyl) tellurophane, 2,4-bis(4,5-epithio-2-oxapentyl)- tellurophane, 2,5-bis(4,5-epithio-2-oxapentyl) tellurophane, 3,4-bis(4,5-epitho-2-oxapentyl) tellurophane, 2,3-bis(3,4-epithio-1-oxabutyl)-1,4-ditellurane, 2,5-bis(3,4-epithio-1-oxabutyl)-1,4-ditellurane, 2,6-bis(3,4-epithio-1-oxabutyl)-1,4-ditellurane, 2,3-bis(4,5-epithio-2-oxapentyl)-1,4-ditellurane, 2,5-bis(4,5-epithio-2-oxapentyl)-1,4-ditellurane, 2,6-bis(4,5-epithio-2-oxapentyl)-1,4-ditellurane, 2,4-bis(3,4-epithio-1-oxabutyl)-1,3-ditellurane, 2,5-bis(3,4-epithio-1-oxabutyl)-1,3-ditellurane, 2,6-bis(3,4-epithio-1-oxabutyl)-1,3-ditellurane, 2,4-bis(4,5-epithio-2-oxapentyl)-1,3-ditellurane, 2,5-bis(4,5-epithio-2-oxapentyl)-1,3-ditellurane, 2,6-bis(4,5-epithio-2-oxapentyl)-1,3-ditellurane, 2,3-bis(3,4-epithio-1-oxabutyl)-1-thia-4-tellurane, 2,5-bis(3, 4-epithio-1-oxabutyl)-1-thia-4-tellurane, 2,6-bis(3,4-epithio-1-oxabutyl)-1-thia-4-tellurane, 3,5-bis(3,4-epithio-1-oxabutyl)-1-thia-4-tellurane, 2,3-bis(4,5-epithio-2-oxapentyl)-1-thia-4-tellurane, 2,5-bis(4,5-epithio-2-oxapentyl)-1-thia-4-tellurane, 2,6-bis(4,5-epithio-2-oxapentyl)-1-thia-4-tellurane and 3,5-bis(4,5-epithio-2-oxapentyl)-1-thia-4-tellurane;

Compounds having an aromatic backbone structure such as 1,3-bis(β-epithiopropyloxy)benzene, 1,4-bis(β-epithiopropyloxy)benzene, 1,3-bis(β-epithiopropyloxymethyl)benzene, 1,4-bis(β-epithiopropyloxymethyl)benzene, bis[4-(β-epithiopropyl)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone and 4,4'-bis(β-epithiopropylthio)biphenyl; and Compounds obtained by replacing at least one hydrogen of the epithio group in the above compounds with methyl.

Examples of the group (C) compound include:

Organic compounds having a chain aliphatic backbone structure such as bis(β-epithiopropyl)sulfide, bis(β-epidithiopropyl)sulfide, bis(β-epithiopropyl) disulfide, bis(β-epidithiopropyl)disulfide, bis(β-epithiopropyl) trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, bis(epithioethyl)sulfide, bis(epithioethyl)disulfide, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-(β-epithiopropylthioethyl)thio]ethane, 1-(β-epithiopropylthio)-2-[[2 -(2-(β-epithiopropylthioethyl)thioethyl]thio]ethane, tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropyltbiomethyl)-3,6-dithiaoctane, 1,8-bis(β-epithiopropylthio)-2,4,5-tris(-epithiopropylthiomethyl)-3,6-dithiaoitane, 1,8-bis(β-epithiopropylthio)-2,5-bis(β-epithiopropyltbiomethyl)-3,6-dithiaoctane, 1,9-bis((β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis[(2-β-epithiopropylthioethyI)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-α-epithiopropylthioethyl)thiomethyl]-3,6,9-trithiaundecane, 1,11-bis(β-epithiopropylthio)-4,7-bis(β-epithiopropylthiomethyl)-3,6,9-trithiaundecane, tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane, 1,1,1-tri[2-(β-epithiopropylthiomethyl)acetylmethyl]propane, bis(5,6-epithio-3-thiahexyl)selinide, 2,3-bis(6,7-thioepoxy-1-selena-4-thiaheptyl)-1-(3,4-thioepoxy-1-thiabutyl)propane, 1,1,3,3-tetrakis(4,5-thioepoxy-2-thiapentyl)-2-selenapropane, bis(4,5-thioepoxy-2-thiapentyl)-3,6,9-triselenaundecane-1,11-bis(3,4-thioepoxy-1-thiabutyl), 1,4-bis(3,4-thioepoxy-1-thiabutyl)-2,3-bis(6,7-thioepoxy-1-selena-4-thiaheptyl)butane, tris(4,5-thioepoxy-2-thiapentyl)-3-selena-6-thiaoctane-1,8-bis(3,4-thioepoxy-1-thiabutyl), bis(5,6-epithio-3-thiahexyl)telluride, 2,3-bis(6,7-thioepoxy-1-tellura-4-thiaheptyl)-1-(3,4-thioepoxy-1-thiabutyl)propane, 1,1,3,3-tetrakis(4,5-thioepoxy-2-thiapentyl)-2-tellurapropane, bis(4,5-thioepoxy-2-thiapentyl)-3,6,9-tritelleraundecane-1,11-bis(3,4-thioepoxy-1-thiabutyl), 1,4-bis(3,4-thioepoxy-1-thiabutyl)-2,3-bis(6,7-thioepoxy-1-tellura-4-thiaheptyl)butane and tris(4,5-thioepoxy-2-thiapentyl)-3-tellura-6-thiaoctane-1,8-bis(3,4-thioepoxy-1-thiabutyl);

Compounds having an alicyclic backbone structure such as 1,3-bis(β-epithiopropylthio)cyclohexane, 1,4-bis(β-epithiopropylthio)cyclohexane, 1,3-bis(β-epithiopropylthiomethyl)cyclohexane, 1,4-bis(β-epithiopropylthiomethyl)cyclohexane, bis[4-(β-epithiopropylthio)-cyclohexyl]methane, 2,2-bis[4-(β-epithiopropylthio)cyclohexyl]propane, bis[4-(β-epithiopropylthio)cyclohexyl] sulfide, 2,5-bis(β-epithiopropylthiomethyl)-1,4-dithiane, 2,5-bis(β-epithiopropylthioethylthiomethyl)-1,4-dithiane, 2,3-bis(3,4-epithio-1-thiabutyl)-1,4-diselenane, 2,5-bis(3,4-epithio-1-thiabutyl)-1,4-diselenane, 2,6-bis(3,4-epithio-1-thiabutyl)-1,4-diselenane, 2,3-bis(4,5-epithio-2-thiapentyl)-1,4-diselenane, 2,5-bis(4,5-epithio-2-thiapentyl)-1,4-diselenane, 2,6-bis(4,5-epithio-2-thiapentyl)-1,4-diselenane, 2,4-bis(3,4-epithio-1-thiabutyl)-1,3-diselenane, 2,5-bis(3,4-epithio-1-thiabutyl)-1,3-diselenane, 5,6-bis(3,4-epithio-1-thiabutyl)-1,3-diselenane, 2,4-bis(4,5-epithio-2-thiapentyl)-1,3-diselenane, 2,5-bis(4,5-epithio-2-thiapentyl)-1,3-diselenane, 5,6-bis(4,5-epithio-2-thiapentyl)-1,3-diselenane, 2,3-bis(3,4-epithio-1-thiabutyl)-1-thia-4-selenane, 2,5-bis(3,4-epithio-1-thiabutyl)-1-thia-4-selenane, 2,6-bis(3,4-epithio-1-thiabutyl)-1-thia-4-selenane, 3,5-bis(3,4-epithio-1-thiabutyl)-1-thia-4-selenane, 2,3-bis(4,5-epithio-2-thiapentyl)-1-thia-4-selenane, 2,5-bis(4,5- epithio-2-thiapentyl)-1-thia-4-selenane, 2,6-bis(4,5-epithio-2-thiapentyl)-1-thia-4-selenane, 3,5-bis(4,5-epithio-2-thiapentyl)-1-thia-4-selenane, 2,4-bis(3,4-epithio-1-thiabutyl)-1,3-diselenolane, 4,5-bis(3,4-epithio-1-thiabutyl)-1,3-5diselenolane, 2,4-bis(4,5-epithio-2-thiapentyl)-1,3-diselenolane, 4,5-bis(4,5-epithio-2-thiapentyl)-1,3-diselenolane, 2,4-bis(3,4-epithio-1-thiabutyl)-1-thia-3-selenolane, 2,5-bis(3,4-epithio-1-thiabutyl)-1-thia-3-selenolane, 4,5-bis(3,4-epithio-1-thiabutyl)-1-thia-3-selenolane, 2,4-bis(4,5-epithio-2-thiapentyl)-1-thia-3-selenolane, 2,5-bis(4,5-epithio-2-thiapentyl)-1-thia-3-selenolane, 4,5-bis(4,5-epithio-2-thiapentyl)-1-thia-3-selenolane, 2,6-bis(4,5-epithio-2-thiapentyl)-1,3,5-triselenane, bis(3,4-epithio-1-thiabutyl)tricycloselenaoctane, bis(3,4-epithio-1-thiabutyl)dicycloselenanonane, 2,3-bis(3,4-epithio-1-thiabutyl)selenophane, 2,4-bis(3,4-epithio-1-thiabutyl)selenophane, 2,5-bis(3,4-epithio-1-thiabutyl)selenophane, 3,4-bis(3,4 epithio-1-thiabutyl)selenophane, 2,3-bis(4,5-epithio-2-thiapentyl)selenophane, 2,4-bis(4,5-epithio-2-thiapentyl)selenophane, 2,5-bis(4,5-epithio-2-thiapentyl)selenophane, 3,4-bis(4,5-epithio-2-thiapentyl)selenophane, 2-(4,5-thioepoxy-2-thiapentyl)-5-(3,4-thioepoxy-1-thiabutyl)-1-selenacyclohexane, 2,3-bis(3,4-thioepoxy-1-thiabutyl)-1-selenacyclohexane, 2,4-bis(3,4-thioepoxy-1-thiabutyl)-1-selenacyclohexane, 2,5-bis(3,4-thioepoxy-1-thiabutyl)-1-selenacyclohexane, 2,6-bis(3,4-thioepoxy-1-thiabutyl)-1-selenacyclohexane, 3,4-bis(3,4-thioepoxy-1-thiabutyl)-1-selenacyclohexane, 3,5-bis(3,4-epoxy-1-thiabutyl)-1-selenacyclohexane, 4,5-bis(3,4-epoxy-1-thiabutyl)-1-selenacyclohexane, 2,3-bis(4,5-thioepoxy-2-thiapentyl)-1-selenacyclohexane, 2,4-bis(4,5-thioepoxy-2-thiapentyl)-1-selenacyclohexane, 2,5-bis(4,5-thioepoxy-2-thiapentyl)-1-selenacyclohexane, 2,6-bis(4,5-thioepoxy-2-thiapentyl)-1-selenacyclohexane, 3,4-bis(4,5-thioepoxy-2-thiapentyl)-1-selenacyclohexane, 3,5-bis(4,5-thioepoxy-2-thiapentyl)-1-selenacyclohexane, 4,5-bis(4,5-thioepoxy-2-thiapentyl)-1-selenacyclohexane, 2,3-bis(4,5-thioepoxy-2-thiapentyl)-1-selenacyclohexane, 2,4-bis(4,5-thioepoxy-2-thiapentyl)-1-selenacyclohexane, 2,5-bis(4,5-thioepoxy-2-thiapentyl)-1-selenacyclohexane, 2,6-bis(4,5-thioepoxy-2-thiapentyl)-1-selenacyclohexane, 3,4-bis(4,5-thioepoxy-2-thiapentyl)-1-selenacyclohexane, 3,5-bis(4,5-thioepoxy-2-thiapentyl)-1-selenacyclohexane, 4,5-bis(4,5-thioepoxy-2-thiapentyl)-1-selenacyclohexane, 4,5-bis(4,5-thioepoxy-2-thiapentyl)-1-selenacyclohexane, 2,3-bis(3,4-epithio-1-thiabutyl)-1,4-ditellurane, 2,5-bis(3,4-epithio-1-thiabutyl)-1,4-ditellurane, 2,6-bis(3,4-epithio-1-thiabutyl)-1,4-ditellurane, 2,3-bis(4,5-epithio-2-thiapentyl)-1,4-ditellurane, 2,5-bis(4,5-epithio-2-thiapentyl)-1,4-ditellurane, 2,6-bis(4,5-epithio-2-thiapentyl)-1,4-ditellurane, 2,4-bis(3,4-epithio-1-thiabutyl)-1,3-ditellurane, 2,5-bis(3,4-epithio-1-thiabutyl)-1,3-ditellurane, 5,6-bis(3,4-epithio-1-thiabutyl)-1,3-ditellurane, 2,4-bis(4,5-epithio-2-thiapentyl)-1,3-ditellurane, 2,5-bis(4,5-epithio-2-thiapentyl)-1,3-ditellurane, 5,6-bis(4,5-epithio-2-thiapentyl)-1,3-ditellurane, 2,3-bis(3,4-epithio-1-thiabutyl)-1-thia-4-tellurane, 2,5-bis(3,4-epithio-1-thiabutyl)-1-thia-4-tellurane, 2,6-bis(3,4-epithio-1-thiabutyl)-1-thia-4-tellurane, 3,5-bis(3,4-epithio-1-thiabutyl)-1-thia-4-tellurane, 2,3-bis(4,5-epithio-2-thiapentyl)-1-thia-4-tellurane, 2,5-bis(4,5-epithio-2-thiapentyl)-1-thia-4-tellurane, 2,6-bis(4,5-epithio-2-thiapentyl)-1-thia-4-tellurane, 3,5-bis(4,5-epithio-2-thiapentyl)-1-thia-4-tellurane, 2,4-bis(3,4-epithio-1-thiabutyl)-1,3-ditellurolane, 4,5-bis(3,4-epithio-1-thiabutyl)-1,3-ditellurolane, 2,4-bis(4,5-epithio-2-thiapentyl)-1,3-ditellurolane, 4,5-bis(4,5-epithio-2-thiapentyl)-1,3-ditellurolane, 2,4-bis(3,4-epithio-1-thiabutyl)-1-thia-3-tellurolane, 2,5-bis(3,4-epithio-1-thiabutyl)-1-thia-3-tellurolane, 4,5-bis(3,4-epithio-1-thiabutyl)-1-thia-3-tellurolane, 2,4-bis(4,5-epithio-2-thiapentyl)-1-thia-3-tellurolane, 2,5-bis(4,5-epithio-2-thiapentyl)-1-thia-3-tellurolane, 4,5-bis(4,5-epithio-2-thiapentyl)-1-thia-3-tellurolane, 2,6-bis(4,5-epithio-2-thiapentyl)-1,3,5-tritellurane, bis(3,4-epithio-1-thiabutyl)tricyclotelluraoctane, bis(3,4-epithio-1-thiabutyl)dicyclotelluranonane, 2,3-bis(3,4-epithio-1-thiabutyl)tellurophane, 2,4-bis(3,4-epithio-1-thiabutyl)tellurophane, 2,5-bis(3,4-epithio-1-thiabutyl)tellurophane, 3,4-bis(3,4-epithio-1-thiabutyl)tellurophane, 2,3-bis(4,5-epithio-2-thiapentyl)tellurophane, 2,4-bis(4,5-epithio-2-thiapentyl)tellurophane, 2,5-bis(4,5-epithio-2-thiapentyl)tellurophane, 3,4-bis(4,5-epithio-2-thiapentyl)tellurophane, 2-(4,5-thioepoxy-2-thiapentyl)-5-(3,4-thioepoxy-1-thiabutyl)-1-telluracyclohexane, 2,3-bis(3,4-thioepoxy-1-thiabutyl)-1-telluracyclohexane, 2,4-bis(3,4-thioepoxy-1-thiabutyl)-1-telluracyclohexane, 2,5-bis(3,4-thioepoxy-1-thiabutyl)-1-telluracyclohexane, 2,6-bis(3,4-thioepoxy-1-thiabutyl)-1-telluracyclohexane, 3,4-bis(3,4-thioepoxy-1-thiabutyl)-1-telluracyclohexane, 3,5-bis(3,4-thioepoxy-1-thiabutyl)-1-telluracyclohexane, 4,5-bis(3,4-thioepoxy-1-thiabutyl)-1-telluracyclohexane, 2,3-bis(3,4-thioepoxy-1-thiabutyl)-1-telluracyclohexane, 2,4-bis(3,4-thioepoxy-1-thiabutyl)-1-telluracyclohexane, 2,5-bis(3,4-thioepoxy-1-thiabutyl)-1-telluracyclohexane, 2,6-bis(3,4-thioepoxy-1-thiabutyl)-1-telluracyclohexane, 3,4-bis(3,4-thioepoxy-1-thiabutyl)-1-telluracyclohexane, 3,5-bis(3,4-thioepoxy-1-thiabutyl)-1-telluracyclohexane, 4,5-bis(3,4-thioepoxy-1-thiabutyl)-1-telluracyclohexane, 2,3-bis(4,5-thioepoxy-2-thiapentyl)-1-telluracyclohexane, 2,4-bis(4,5-thioepoxy-2-thiapentyl)-1-teluracyclohexane, 2,5-bis(4,5-thioepoxy-2-thiapentyl)-1-telluracyclohexane, 2,6-bis(4,5-thioepoxy-2-thiapentyl)-1-telluracyclohexane, 3,4-bis(4,5-thioepoxy-2-thiapentyl)-1-telluracyclohexane, 3,5-bis(4,5-thioepoxy-2-thiapentyl)-1-telluracyclohexane and 4,5-bis(4,5-thioepoxy-2-thiapentyl)-1-telluracyclohexane;

Compounds having an aromatic backbone structure such as 1,3-bis(β-epithiopropylthio)benzene, 1,4-bis(β-epithiopropylthio)benzene, 1,3-bis(β-epithiopropylthiomethyl)benzene, 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone and 4,4'-bis(β-epithiopropylthio)biphenyl; and Compounds obtained by replacing at least one hydrogen atom of the β-epithiopropyl group in the above compounds with methyl group.

Examples of the group (D) compound include:

Organic compounds having a chain aliphatic backbone structure such as bis(β-epithiopropyl)selenide, bis(β- epidithiopropyl)selenide, bis(β-epithiopropyl) diselenide, bis(β-epidithiopropyl)diselenide, bis(β-epithiopropyl)triselenide, bis(β-epithiopropylseleno) methane, 1,2-bis(β-epithiopropylseleno)ethane, 1,3-bis (β-epithiopropylseleno)propane, 1,2-bis(β-epithiopropylseleno)propane, bis(epithioethyl) selenide, bis(epithioethyl)diselenide, 1-(β-epithiopropylseleno)-2-(β-epithiopropylselenomethyl) propane, 1,4-bis(β-epithiopropylseleno)butane, 1,3-bis (β-epithiopropylseleno)butane, 1-(β-epithiopropylseleno)-3-(β-epithiopropylselenomethyl) butane, 1,5-bis(β-epithiopropylseleno)pentane, 1-(β-epithiopropylseleno)-4-(β-epithiopropylselenomethyl) pentane, 1,6-bis(β-epithiopropylseleno)hexane, 1-(β-epithiopropylseleno)-5-(β-epithiopropylselenomethyl) hexane, 1-(β-epithiopropylseleno)-2-[(2-β-epithiopropylselenoethyl)thio]ethane, 1-(β-epithiopropylseleno)-2-[[2-(2-(β-epithiopropylselenoethyl)selenoethyl]thio]ethane, tetrakis(β-epithiopropylselenomethyl)methane, 1,1,1-tris(β-epithiopropylselenomethyl)propane, 1,5-bis(β-epithiopropylseleno)-2-(β-epithiopropylselenomethyl)-3-thiapentane, 1,5-bis(β-epithiopropylseleno)-2,4-bis(β-epithiopropylselenomethyl)-3-thiapentane, 1-(β-epithiopropylseleno)-2,2-bis(β-epithiopropylselenomethyl)-4-thiahexane, 1,5,6-tris(β-epithiopropylseleno)-4-(β-epithiopropylselenomethyl)-3-thiahexane, 1,8-bis(β-epithiopropylseleno)-4-(β-epithiopropylselenomethyl)-3,6-dithiaoctane, 1,8-bis (β-epithiopropylseleno)-4,5-bis(β-epithiopropylselenomethyl)-3,6-dithiaoctane, 1,8-bis (β-epithiopropylseleno)-4,4-bis(β-epithiopropylselenomethyl)-3,6-dithiaoctane, 1,8-bis (β-epithiopropylseleno)-2,4,5-tris(β-epithiopropylselenomethyl)-3,6-dithiaoctane, 1,8-bis (β-epithiopropylseleno)-2,5-bis(β-epithiopropylselenomethyl)-3,6-dithiaoctane, 1,9-bis (β-epithiopropylseleno)-5-(β-epithiopropylselenomethyl)-5-[(2-β-epithiopropylselenoethyl)selenomethyl]-3,7-dithianonane, 1,10-bis(β-epithiopropylseleno)-5,6-bis [(2-β-epithiopropylselenoethyl)thio]-3,6,9-trithiadecane, 1,11-bis(β-epithiopropylseleno)-4,8-bis (β-epithiopropylselenomethyl)-3,6,9-trithiaundecane, 1,11-bis(β-epithiopropylseleno)-5,7-bis(β-epithiopropylselenomethyl)-3,6,9-trithiaundecane, 1,11-bis(β-epithiopropylseleno)-5,7-[(2-(β-epithiopropylselenoethyl)selenomethyl]-3,6,9-trithiaundecane, 1,11-bis(β-epithiopropylseleno)-4,7-bis(β-epithiopropylselenomethyl)-3,6,9-trithiaundecane, tetra[2-(β-epithiopropylseleno) acetylmethyl]methane, 1,1,1-tri[2-(β-epithiopropylseleno)acetylmethyl]propane, tetra[2-(β-epithiopropylselenomethyl)acetylmethyl]methane, 1,1,1-tri[2-(β-epithiopropylselenomethyl) acetylmethyl]propane, bis(5,6-epithio-3-selenohexyl) selenide, 2,3-bis(6,7-thioepoxy-1-selena-4-selenoheptyl)-1-(3,4-thioepoxy-1-selenobutyl) propane, 1,1,3,3-tetrakis(4,5-thioepoxy-2-selenopentyl)-2-selenapropane, bis(4,5-thioepoxy-2-selenopentyl)-3,6,9-triselenaundecane-1,11-bis(3,4-thioepoxy-1-selenobutyl), 1,4-bis(3,4-thioepoxy-1-selenobutyl)-2,3-bis(6,7-thioepoxy-1-selena-4-selenoheptyl)butane, tris(4,5-thioepoxy oxy-2-selenopentyl)-3-selena-6-thiaoctane-1,8-bis(3,4-thioepoxy-1-selenobutyl), bis(5,6-epithio-3-selenohexyl)telluride, 2,3-bis(6,7-thioepoxy-1-tellura-4-selenoheptyl)-1-(3,4-thioepoxy-1-selenobutyl) propane, 1,1,3,3-tetrakis(4,5-thioepoxy-2-selenopentyl)-2-telluropropane, bis(4,5-thioepoxy-2-selenopentyl)-3,6,9-tritelleraundecane-1,11-bis(3,4-thioepoxy-1-selenobutyl), 1,4-bis(3,4-thioepoxy-1-selenobutyl)-2,3-bis(6,7-thioepoxy-1-tellura-4-selenoheptyl)butane and tris(4,5-thioepoxy-2-selenopentyl)-3-tellura-6-thiaoctane-1,8-bis(3,4-thioepoxy-1-selenobutyl);

Compounds having an alicyclic backbone structure such as 1,3-bis(β-epithiopropylseleno)cyclohexane, 1,4-bis (β-epithiopropylseleno)cyclohexane, 1,3-bis(β-epithiopropylselenomethyl)cyclohexane, 1,4-bis(β-epithiopropylselenomethyl)cyclohexane, bis[4-(β-epithiopropylseleno)cyclohexyl]methane, 2,2-bis[4-(β-epithiopropylseleno)cyclohexyl]propane, bis[4-(β-epithiopropylseleno)cyclohexyl]sulfide, 2,5-bis(β-epithiopropylselenomethyl)-1,4-dithiane, 2,5-bis(β-epithiopropylselenoethylthiomethyl)-1,4-dithiane, 2,3-bis(3,4-epithio-1-selenobutyl)-1,4-diselenaine, 2,5-bis (3,4-epithio-1-selenobutyl)-1,4-diselenane, 2,6-bis(3, 4-epithio-1-selenobutyl)-1,4-diselenane, 2,3-bis(4,5-epithio-2-selenopentyl)-1,4-diselenane, 2,5-bis(4,5-epithio-2-selenopentyl)-1,4-diselenane, 2,6-bis(4,5-epithio-2-selenopentyl)-1,4-diselenane, 2,4-bis(3,4-epithio-1-selenobutyl)-1,3-diselenane, 2,5-bis(3,4-epithio-1-selenobutyl)-1,3-diselenane, 5,6-bis(3,4-epithio-1-selenobutyl)-1,3-diselenane, 2,4-bis(4,5-epithio-2-selenopentyl)-1,3-diselenane, 2,5-bis(4,5-epithio-2-selenopentyl)-1,3-diselenane, 5,6-bis(4,5-epithio-2-selenopentyl)-1,3-diselenane, 2,3-bis(3,4-epithio-1-selenobutyl)-1-thia-4-selenane, 2,5-bis(3,4-epithio-1-selenobutyl)-1-thia-4-selenane, 2,6-bis(3,4-epithio-1-selenobutyl)-1-thia-4-selenane, 3,5-bis(3,4-epithio-1-selenobutyl)-1-thia-4-selenane, 2,3-bis(4,5-epithio-2-selenopentyl)-1-thia-4-selenane, 2,5-bis(4,5-epithio-2-selenopentyl)-1-thia-4-selenane, 2,6-bis(4,5-epithio-2-selenopentyl)-1-thia-4-selenane, 3,5-bis(4,5-epithio-2-selenopentyl)-1-thia-4-selenane, 2,4-bis(3,4-epithio-1-selenobutyl)-1,3-diselenolane, 4,5-bis(3,4-epithio-1-selenobutyl)-1,3-diselenolane, 2,4-bis(4,5-epithio-2-selenopentyl)-1,3-diselenolane, 4,5-bis(4,5-epithio-2-selenopentyl)-1,3-diselenolane, 2,4-bis(3,4-epithio-1-selenobutyl)-1-thia-3-selenolane, 2,5-bis(3,4-epithio-1-selenobutyl)-1-thia-3-selenolane, 4,5-bis(3,4-epithio-1-selenobutyl)-1-thia-3-selenolane, 2,4-bis(4,5-epithio-2-selenopentyl)-1-thia-3-selenolane, 2,5-bis(4,5-epithio-2-selenopentyl)-1-thia-3-selenolane, 4,5-bis(4,5-epithio-2-selenopentyl)-1-thia-3-selenolane, 2,6-bis(4,5-epithio-2-selenopentyl)-1,3,5-triselenane, bis(3,4-epithio-1-selenobutyl) tricycloselenaoctane, bis(3,4-epithio-1-selenobutyl) dicycloselenanonane, 2,3-bis(3,4-epithio-1-selenobutyl)selenophane, 2,4-bis(3,4-epithio-1-selenobutyl)selenophane, 2,5-bis(3,4-epithio-1-selenobutyl)selenophane, 3,4bis(3,4-epithio-1-selenobutyl)selenophane, 2,3-bis(4,5-epithio-2-selenopentyl)selenophane, 2,4-bis(4,5-epithio-2-selenopentyl)selenophane, 2,5-bis(4,5-epithio-2-selenopentyl)selenophane, 3,4-bis(4,5-epithio-2-selenopentyl)selenophane, 2-(4,5-thioepoxy-2-selenopentyl)-5-(3,4-thioepoxy-1-selenobutyl)-1-selenacyclohexane, 2,3-, 2,4-, 2,5-, 2,6-, 3,4-, 3,5- or 4,5-bis(3,4-thioepoxy-1-selenobutyl)-1-selenacyclohexane, 2,3-, 2,4-, 2,5-, 2,6-, 3,4-, 3,5- or 4,5-bis(4,5-thioepoxy-2-selenopentyl)-1-selenacyclohexane, 2,3-, 2,5- or 2,6-bis(3,4-epithio-1-selenobutyl)-1,4-ditellurane, 2,3-, 2,5- or 2,6-bis(4,5-epithio-2-selenopentyl)-1,4-ditellurane, 2,4-, 2,5- or 5,6-bis(3,4-epithio-1-selenobutyl)-1,3-ditellurane, 2,4-, 2,5- or 5,6-bis(4,5-epithio-2-selenopentyl)-1-3-ditellurane, 2,3-, 2,5-, 2,6- or 3,5-bis(3,4-epithio-1-selenobutyl)-1-thia-4-tellurane, 2,3-, 2,5-, 2,6- or 3,5-bis(4,5-epithio-2-selenopentyl)-1-thia-4-tellurane, 2,4- or 4,5-bis(3,4-epithio-1-selenobutyl)-1,3-ditellurolane, 2,4- or 4,5-bis(4,5-epithio-2-selenopentyl)-1,3-ditellurolane, 2,4-, 2,5- or 4,5-bis(3,4-epithio-1-selenobutyl)-1-thia-3-tellurolane, 2,4-, 2,5- or 4,5-bis(4,5-epithio-2-selenopentyl)-1-thia-3-tellurolane, 2,6-bis(4,5-epithio-2-selenopentyl)-1,3,5-tritellurane, bis (3,4-epithio-1-selenobutyl)tricyclotelluraoctane, bis(3, 4-epithio-1-selenobutyl)dicyclotelluranonane, 2,3-, 2,4-, 2,5- or 3,4-bis(3,4-epithio-1-selenobutyl) tellurophane, 2,3-, 2,4-, 2,5- or 3,4-bis(4,5-epithio-2-selenopentyl)tellurophane, 2-(4,5-thioepoxy-2-selenopentyl)-5-(3,4-thioepoxy-1-selenobutyl)-1-telluracyclohexane, 2,3-, 2,4-, 2,5-, 2,6-, 3,4-, 3,5- or 4,5-bis(3,4-thioepoxy-1-selenobutyl)-1-telluracyclohexane, and 2,3-, 2,4-, 2,5-, 2,6-, 3,4-, 3,5- or 4,5-bis(4,5-thioepoxy-2-selenopentyl)-1-telluracyclohexane;

Compounds having an aromatic backbone structure such as 1,3- or 1,4-bis(β-epithiopropylseleno)benzene, 1,3- or 1,4-bis(β-epithiopropylselenomethyl)benzene, bis [4-(β-epithiopropylseleno)phenyl]methane, 2,2-bis[4-(β-epithiopropylseleno)phenyl]propane, bis[4-(β-epithiopropylseleno)phenyl]sulfide, bis[4-(β-epithiopropylseleno)phenyl]sulfone and 4,4'-bis(β-epithiopropylseleno)biphenyl; and Compounds obtained by replacing at least one hydrogen of the β-epithiopropyl group in the above compounds with methyl.

Examples of the group (E) compound include:

Organic compounds having a chain aliphatic backbone structure such as bis(β-epithiopropyl)telluride, bis(β-epidithiopropyl)telluride, bis(β-epithiopropyl)ditelluride, bis(β-epidithiopropyl)ditelluride, bis(β-epithiopropyl)tritelluride, bis(β-epithiopropyltelluro) methane, 1,2-bis(β-epithiopropyltelluro)ethane, 1,3-bis (β-epithiopropyltelluro)propane, 1,2-bis(β-epithiopropyltelluro)propane, bis(epithioethyl) telluride, bis(epithioethyl)ditelluride, 1-(β-epithiopropyltelluro)-2-(β-epithiopropyltelluromethyl) propane, 1,4-bis(β-epithiopropyltelluro)butane, 1,3-bis (β-epithiopropyltelluro)butane, 1-(β-epithiopropyltelluro)-3-(β-epithiopropyltelluromethyl)-butane, 1,5-bis(β-epithiopropyltelluro)pentane, 1-(β-epithiopropyltelluro)-4-(β-epithiopropyltelluromethyl) pentane, 1,6-bis(β-epithiopropyltelluro)hexane, 1-(β-epithiopropyltelluro)-5-(β-epithiopropyltelluromethyl) hexane, 1-(β-epithiopropyltelluro)-2-[(2-(β-epithiopropyltelluroethyl)thio]ethane, 1-(β-epithiopropyltelluro)-2 -[[2-(2-(β-epithiopropyltelluroethyl)telluroethyl]thio]ethane, tetrakis(β-epithiopropyltelluromethyl)methane, 1,1,1-tris(β-epithiopropyltelluromethyl)propane, 1,5-bis(β-epithiopropyltelluro)-2-(β-epithiopropyltelluromethyl)-3-thiapentane, 1,5-bis(β-epithiopropyltelluro)-2,4-bis(β-epithiopropyltelluromethyl)-3-thiapentane, 1-(β-epithiopropyltelluro)-2,2-bis(β-epithiopropyltelluromethyl)-4-thiahexane, 1,5,6-tris(β-epithiopropyltelluro)-4-(β-epithiopropyltelluromethyl)-3-thiahexane, 1,8-bis(β-epithiopropyltelluro)-4-(β-epithiopropyltelluromethyl)-3,6-dithiaoctane, 1,8-bis (β-epithiopropyltelluro)-4,5-bis(β-epithiopropyltelluromethyl)-3,6-dithiaoctane, 1,8-bis (β-epithiopropyltelluro)-4,4-bis(β-epithiopropyltelluromethyl)-3,6-dithiaoctane, 1,8-bis (β-epithiopropyltelluro)-2,4,5-tris(β-epithiopropyltelluromethyl)-3,6-dithiaoctane, 1,8-bis (β-epithiopropyltelluro)-2,5-bis(β-epithiopropyltelluromethyl)-3,6-dithiaoctane, 1,9-bis (β-epithiopropyltelluro)-5-(β-epithiopropyltelluromethyl)-5-[(2-β-epithiopropyltelluroethyl)selenomethyl]-3,7-dithianonane, 1,10-bis(β-epithiopropyltelluro)-5,6-bis [(2-(β-epithiopropyltelluroethyl)thio]-3,6,9-trithiadecane, 1,11-bis(β-epithiopropyltelluro)-4,8-bis (β-epithiopropyltelluromethyl)-3,6,9-trithiaundecane, 1,11-bis(β-epithiopropyltelluro)-5,7-bis(β-epithiopropyltelluromethyl)-3,6,9-trithiaundecane, 1,11-bis(β-epithiopropyltelluro)-5,7-[(2-β-epithiopropyltelluroethyl)selenomethyl]-3,6,9-trithiaundecane, 1,11-bis(β-epithiopropyltelluro)-4,7-bis(β-epithiopropyltelluromethyl)-3,6,9-trithiaundecane, tetra[2-(β-epithiopropyltelluro) acetylmethyl]methane, 1,1,1-tri[2-(β-epithiopropyltelluro)acetylmethyl]propane, tetra[2-(β-epithiopropyltelluromethyl)acetylmethyl]methane, 1,1, 1-tri[2-(β-epithiopropyltelluromethyl)acetylmethyl] propane, bis(5,6-epithio-3-tellurohexyl)selenide, 2,3-bis(6,7-thioepoxy-1-selena-4-telluroheptyl)-1-(3,4-thioepoxy-1-tellurobutyl)propane, 1,1,3,3-tetrakis(4,5-thioepoxy-2-telluropentyl)-2-selenapropane, bis(4,5-thioepoxy-2-telluropentyl)-3,6,9-triselenaundecane-1,11-bis(3,4-thioepoxy-1-tellurobutyl), 1,4-bis(3,4-thioepoxy-1-tellurobutyl)-2,3-bis(6,7-thioepoxy-1-selena-4-telluroheptyl)butane, tris(4,5-thioepoxy-2-telluropentyl)-3-selena-6-thiaoctane-1,8-bis(3,4-thioepoxy-1-tellurobutyl), bis(5,6-epithio-3-tellurohexyl)telluride, 2,3-bis(6,7-thioepoxy-1-tellura-4-telluroheptyl)-1-(3,4-thioepoxy-17tellurobutyl) propane, 1,1,3,3-tetrakis(4,5-thioepoxy-2-telluropentyl)-2-tellurapropane, bis(4,5-thioepoxy-2-telluropentyl)-3,6,9-tritelleraundecane-1,11-bis(3,4-thioepoxy-1-tellurobutyl), 1,4-bis(3 ,4-thioepoxy-1-tellurobutyl)-2,3-bis(6,7-thioepoxy-1-tellura-4-telluroheptyl)butane and tris(4,5-thioepoxy-2-telluropentyl)-3-tellura-6-thiaoctane-1,8-bis(3,4-thioepoxy-1-tellurobutyl);

Compounds having an alicyclic backbone structure such as 1,3-bis(β-epithiopropyltelluro)cyclohexane, 1,4-bis (β-epithiopropyltelluro)cyclohexane, 1,3-bis(β-epithiopropyltelluromethyl)cyclohexane, 1,4-bis(β-epithiopropyltelluromethyl)cyclohexane, bis[4-(β-epithiopropyltelluro)cyclohexyl]methane, 2,2-bis[4-(β-epithiopropyltelluro)cyclohexyl]propane, bis[4-(β-epithiopropyltelluro)cyclohexyl]sulfide, 2,5-bis(β-epithiopropyltelluromethyl)-1,4-dithiane, 2,5-bis(β-epithiopropyltelluroethylthiomethyl)-1,4-dithiane, 2,3-, 2,5- or 2,6-bis(3,4-epithio-1-tellurobutyl)-1,4-diselenane, 2,3-bis(4,5-epithio-2-telluropentyl)-1,4-diselenane, 2,5-bis(4,5-epithio-2-telluropentyl)-1,4-diselenane, 2,6-bis(4,5-epithio-2-telluropentyl)-1,4-diselenane, 2,4-bis(3,4-epithio-1-tellurobutyl)-1,3-diselenane, 2,5-bis(3,4-epithio-1-tellurobutyl)-1,3- diselenane, 5,6-bis(3,4-epithio-1-tellurobutyl)-1,3-diselenane, 2,4-bis(4,5-epithio-2-telluropentyl)-1,3-diselenane, 2,5-bis(4,5-epithio-2-telluropentyl)-1,3-diselenane, 5,6-bis(4,5-epithio-2-telluropentyl)-1,3-diselenane, 2,3-bis(3,4-epithio-1-tellurobutyl)-1-thia-4-selenane, 2,5-bis(3,4-epithio-1-tellurobutyl)-1-thia-4-selenane, 2,6-bis(3,4-epithio-1-tellurobutyl)-1-thia-4-selenane, 3,5-bis(3,4-epithio-1-tellurobutyl)-1-thia-4-selenane, 2,3-bis(4,5-epithio-2-telluropentyl)-1-thia-4-selenane, 2,5-bis(4,5-epithio-2-telluropentyl)-1-thia-4-selenane, 2,6-bis(4,5-epithio-2-telluropentyl)-1-thia-4-selenane, 3,5-bis(4,5-epithio-2-telluropentyl)-1-thia-4-selenolane, 2,4-bis(3,4-epithio-1-tellurobutyl)-1,3-diselenolane, 4,5-bis(3,4-epithio-1-tellurobutyl)-1,3-diselenolane, 2,4- or 4,5-bis(4,5-epithio-2-telluropentyl)-1,3-diselenolane, 2,4-, 2,5- or 4,5-bis(3, 4-epithio-1-tellurobutyl)-1-thia-3-selenoolane, 2,4-, 2,5- or 4,5-bis(4,5-epithio-2-telluropentyl)-1-thia-3-selenolane, 2,6-bis(4,5-epithio-2-telluropentyl)-1,3,5-triselenane, bis(3,4epithio-1-tellurobutyl) tricycloselenaoctane, bis(3,4-epithio-1-tellurobutyl) dicycloselenanonane, 2,3-, 2,4-, 2,5- or 3,4-bis(3,4-epithio-1-tellurobutyl)selenophane, 2,3-, 2,4-, 2,5- or 3,4-bis(4,5-epithio-2-telluropentyl)selenophane, 2-(4, 5-thioepoxy-2-telluropentyl)-5-(3,4-thioepoxy-1-tellurobutyl)-1-selenacyclohexane, 2,3-, 2,4-, 2,5-, 2,6-, 3,4-, 3,5- or 4,5-bis(3,4-thioepoxy-1-tellurobutyl)-1-selenacyclohexane, 2,3-, 2,4-, 2,5-, 2,6-, 3,4-, 3,5- or 4,5-bis(4,5-thioepoxy-2-telluropentyl)-1-selenacyclohexane, 2,3-, 2,5- or 2,6-bis(3,4-epithio-1-tellurobutyl)-1,4-ditellurane, 2,3-, 2,5- or 2,6-bis(4,5-epithio-2-5telluropentyl)-1,4-ditellurane, 2,4-, 2,5- or 5,6-bis(3,4-epithio-1-tellurobutyl)-1,3-ditellurane, 2,4-, 2,5- or 5,6-bis(4,5-epithio-2-telluropentyl)-1,3-ditellurane, 2,3-, 2,5-, 2,6- or 3,5-bis(3,4-epithio-1-tellurobutyl)-1-thia-4-tellurane, 2,3-, 2,5-, 2,6- or 3,5-bis(4,5-epithio-2-telluropentyl)-1-thia-4-tellurane, 2,4- or 4,5-bis(3,4-epithio-1-tellurobutyl)-1,3-ditellurolane, 2,4- or 4,5-bis(4,5-epithio-2-telluropentyl)-1,3-ditellurolane, 2,4-, 2,5- or 4,5-bis(3,4-epithio-1-tellurobutyl)-1-thia-3-tellurolane, 2,4-, 2,5- or 4,5-bis(4,5-epithio-2-telluropentyl)-1-thia-3-tellurolane, 2,6-bis(4,5-epithio-2-telluropentyl)-1,3,5-tritellurane, bis(3,4-epithio-1-tellurobutyl)tricyclotelluraoctane, bis(3,4-epithio-1-tellurobutyl)dicyclotelluranonane, 2,3-, 2,4-, 2,5- or 3,4-bis(3,4-epithio-1-tellurobutyl)tellurophane, 2,3-, 2,4-, 2, 5- or 3,4-bis(4,5-epithio-2-telluropentyl) tellurophane, 2-(4,5-thioepoxy-2-telluropentyl)-5-(3,4-thioepoxy-1-tellurobutyl)-1-telluracyclohexane, 2,3-, 2,4-, 2,5-, 2,6-, 3,4-, 3,5- or 4,5-bis(3,4-thioepoxy-1-tellurobutyl)-1-telluracyclohexane, and 2,3-, 2,4-, 2,5-, 2,6-, 3,4-, 3,5- or 4,5-bis(4,5-thioepoxy-2-telluropentyl)-1-telluracyclohexane;

Compounds having an aromatic backbone structure such as 1,3- or 1,4-bis(β-epithiopropyltelluro)benzene, 1,3- or 1,4-bis(β-epithiopropyltelluromethyl)benzene, bis [4-(β-epithiopropyltelluro)phenyl]methane, 2,2-bis[4-(β-epithiopropyltelluro)phenyl]propane, bis[4-(β-epithiopropyltelluro)phenyl]sulfide, bis[4-(β-epithiopropyltelluro)phenyl]sulfone and 4,4'-bis(β-epithiopropyltelluro)biphenyl; and Compounds obtained by replacing at least one hydrogen of the β-epithiopropyl group in the above compounds with methyl.

Further examples of the group (A) to (E) compounds include organic compounds having unsaturated groups. Specific examples of such compounds include vinylphenyl thioglycidyl ether, vinylbenzyl thioglycidyl ether, thioglycidyl methacrylate, thioglycidyl acrylate and allyl thioglycidyl ether.

It should be noted that the compound (a) is not limited to the above examples. The compound (a) may be used singly or in combination of two or more.

Among the above compounds, preferred are the group (B) compounds (Y of the formula (1) is O), the group (C) compound (Y of the formula (1) is S) and the group (D) compound (Y of the formula (1) is Se). More preferred are the group (C) and (D) compounds. The group (C) and (D) compounds wherein m is 1 or 2 and n is 1 or 2 are still more preferable, and particularly preferable when m is 1 and n is 1 or 2. Examples of the particularly preferable compound include bis(β-epithiopropyl)sulfide, bis(β-epithiopropyl) disulfide, bis(β-epithiopropyl)selenide and bis(β-epithiopropyl)diselenide. Other examples are chain compounds, branched compounds, alicyclic compounds, aromatic compounds and heterocyclic compounds which have at least two β-epithiopropylthio groups or β-epithiopropylseleno groups, which are described above as the examples. Among the particularly preferable compounds, chain compounds and branched compounds which have at least two β-epithiopropylthio groups or β-epithiopropylseleno groups, bis(β-epithiopropyl)sulfide, bis(β-epithiopropyl)disulfide, bis(β-epithiopropyl)selenide and bis(β-epithiopropyl)diselenide are most preferable.

The compound (b) used in the present invention has at least one group selected from the group consisting of isocyanate group and isothiocyanate group in one molecule. Examples thereof include monoisocyanates such as methyl isocyanate, ethyl isocyanate, propyl isocyanate, isopropyl isocyanate, n-butyl isocyanate, sec-butyl isocyanate, tert-butyl isocyanate, pentyl isocyanate, hexyl isocyanate, octyl isocyanate, dodecyl isocyanate, cyclohexyl isocyanate, phenyl isocyanate and toluyl isocyanate; polyisocyanates such as diethylene diisocyanate, tetramethylene diisocyanate, hexamethylene diisocyanate, trimethylhexamethylene diisocyanate, cyclohexane diisocyanate, 1,3-bis (isocyanatomethyl)cyclohexane, 1,4-bis(isocyanatomethyl) cyclohexane, isophorone diisocyanate, 2,6-bis (isocyanatomethyl)decahydronaphthalene, lysine triisocyanate, 2,4-tolylene diisocyanate, 2,6-tolylene diisocyanate, o-toluidine diisocyanate, 4,4'-diphenylmethane diisocyanate, diphenyl ether diisocyanate, 3-(2'-isonyanatocyclohexyl)propyl isocyanate, tris (phenylisocyanato)thiophosphate, isopropylidenebis (cyclohexyl isocyanate), 2,2'-bis(4-isocyanatophenyl) propane, triphenylmethane triisocyanate, bis (diisocyanatotolyl)phenylmethane, 4,4',4"-triisocyanato-2, 5-dimethoxyphenylamine, 3,3'-dimethoxybenzidine-4,4'-diisocyanate, 1,3-phenylene diisocyanate, 1,4-phenylene diisocyanate, 4,4'-diisocyanatobiphenyl, 4,4'-diisocyanate-3,3'-dimethylbiphenyl, dicyclohexylmethane-4,4'-diisocyanate, 1,1'-methylenebis(4-isocyanatobenzene), 1,1'-methylenebis(3-methyl-4-isocyanatobenzene), m-xylylene diisocyanate, p-xylylene diisocyanate, 1,3-bis(1-isocyanate-1-methylethyl)benzene, 1,4-bis(1-isocyanate-1-methylethyl)benzene, 1,3-bis(2-isocyanate-2-propyl) benzene, 2,6-bis(isocyanatomethyl)naphthalene, 1,5-naphthalene diisocyanate, bis(isocyanatomethyl) tetrahydrodicyclopentadiene, bis(isocyanatomethyl) dicyclopentadiene, bis(isocyanatomethyl) tetrahydrothiophene, bis(isocyanatomethyl)thiophene, 2,5-diisocyanatomethylnorbornene, bis(isocyanatomethyl) adamantane, 3,4-diisocyanatoselenophane, 2,6- diisocyanate-9-selenabicyclononane, bis(isocyanatomethyl) selenophane, 3,4-diisocyanate-2,5-diselenolane, dimer acid diisocyanate and 1,3,5-tri(1-isocyanatohexyl)isocyanuric acid; burette reaction dimers of these polyisocyanates; cyclic trimers of these polyisocyanates; addition products of these polyisocyanates with alcohols or thiols; and compounds obtained by partially or entirely replacing the isocyanate groups in the above compounds with isothiocyanate group.

It should be noted that the compounds (b) usable in the present invention are not strictly limited to those recited above. The compounds (b) may be used singly or in combination of two or more. Among the above compounds, compounds having at least two groups selected from the group consisting of isocyanate group and isothiocyanate group are preferable. Cyclic compounds having at least two groups selected from the group consisting of isocyanate group and isothiocyanate group are more preferable. Still more preferred are aromatic or alicyclic compounds having two or more isocyanate groups, and most preferred are aromatic diisocyanates and alicyclic diisocyanates.

The compounds (c) used in the present invention have at least one mercapto group in one molecule, and may be mercaptans or thiophenols which may have an unsaturated group such as vinyl group, aromatic vinyl groups, methacryl group, acryl group and ally group. Examples of the mercaptans include monomercaptans such as methyl mercaptan, ethyl mercaptan, n-propyl -mercaptan, n-butyl mercaptan, allyl mercaptan, n-hexyl mercaptan, n-octyl -mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, benzyl mercaptan, 4-chlorobenzyl mercaptan, methyl thioglycolate, ethyl thioglycolate, n-butyl thioglycolate, n-octyl thioglycolate, methyl (3-mercaptopropionate), ethyl (3-mercaptopropionate), 3-methoxybutyl (3-methylpropionate), n-butyl (3-mercaptopropionate), 2-ethylhexyl (3-mercaptopropionate), n-octyl (3-mercaptopropionate), 2-mercaptoethanol, 3-mercaptopropanol, 2-mercaptopropanol, 2-hydroxypropyl mercaptan, 2-phenyl-2-mercaptoethanol, 2-phenyl-2-hydroxyethyl mercaptan, 3-mercapto-1,2-propanediol and 2-mercapto-1,3-propanediol; polymercaptans such as methanedithiol, 1,2-dimercaptoethane, 1,2-dimercaptopropane, 2,2-dimercaptopropane, 1,3-dimercaptopropanle, 1,2,3-trimercaptopropane, 1,4-dimercaptobutane, 1,6-dimercaptohexane, bis(2-mercaptoethyl)sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, ethylene glycol bis(2-mercaptoacetate), ethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,1-dimercaptocyclohexane, 1,4-dimercaptocyclohexane, 1,3-dimercaptocyclohexane, 1,2-dimercaptocyclohexane, 1,4-bis(mercaptomethyl) cyclohexane, 1,3-bis-(mercaptomethyl)cyclohexane, 2,5-bis (mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, 1,4-bis(mercaptomethyl)benzene, 1,3-bis(mercaptomethyl)benzene, bis(4-mercaptophenyl) sulfide, bis(4-mercaptophenyl)ether, 2,2-bis(4-mercaptophenyl)propane, bis(4-mercaptomethylphenyl) sulfide, bis(4-mercaptomethylphenyl)ether, 2,2-bis(4-mercaptomethylphenyl)propane, 2,5-dimercapto-1,3,4-thiadiazole, 3,4-thiophenedithiol, 1,2-dimercapto-3-propanol, 1,3-dimercapto-2-propanol and glyceryl dithioglycolate; and oligomers of 2 to 20 polymerization degree of the above compounds.

Examples of the thiophenols include thiophenol, 4-tert-butylthiophenol, 2-methylthiophenol, 3-methylthiophenol, 4-methylthiophenol, 1,2-dimercaptobenzene, 1,3-dimercaptobenzene, 1,4-dimercaptobenzene, 2-hydroxythiophenol, 3-hydroxythiophenol and 4-hydroxythiophenol.

Examples of the mercaptan having an unsaturated group include allyl mercaptan, 2-vinylbenzyl mercaptan, 3-vinylbenzyl mercaptan and 4-vinylbenzyl mercaptan.

Examples of the thiophenol having an unsaturated group include 2-vinylthiophenol, 3-vinylthiophenol and 4-vinylthiophenol.

It should be noted that the compounds (c) usable in the present invention are not strictly limited to the compounds The compounds (c) may be used singly or in combination of two or more.

Among the compounds (c) described above, preferred are compounds having at least two mercapto groups in one molecule, which may have a sulfur atom other than the mercapto group, preferably as a sulfide group. Specifically, a polythiol having a sulfide group (—S—) is more preferred, and a polythiol compound having a sulfur-containing ring structure, preferably in which a mercapto group is attached to the sulfur-containing ring structure directly or indirectly through an alkylene group having 1 to 10 carbon atoms, and a compound represented by the following formula:

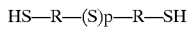

HS—R—(S)p—R—SH wherein p is 1 or 2 and two R groups may be the same or different and each an alkylene group having 1 to 10 carbon atoms or a mercaptoalkylene group having 1 to 10 carbon atoms, are most preferred.

The composition of the present invention comprising the compound (a), compound (b) and compound (c) is made into a resin by polymerization under heating in the absence of, preferably in the presence of a curing catalyst. As the curing catalyst, amines, quaternary ammonium salts, phosphines, quaternary phosphonium salts, tertiary sulfonium salts, secondary iodonium salts, mineral acids, Lewis acids, organic acids, silicic acids and tetrafluoroboric acid are used. Examples of the curing catalyst include:

(1) Amine compounds including primary amines such as ethylamine, n-propylamine, sec-propylamine, n-butylamine, sec-butylamine, isobutylamine, tert-butylamine, pentylamine, bexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphthylamine and furfurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl) ether, 1,2-bis-(3-aminopropoxy)ethane, 1,3-bis-(3-aminopropoxy)-2,2'-dimethylpropane, aminoethylethanolamine, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, 2- or 4-aminopiperidine, 2- or 4-aminomethylpiperidine, 2- or 4-aminoethylpiperidine, N-aminoethylpiperidine, N-aminopropylpiperidine, N-aminoethylmorpholine, N-aminopropylmorpholine, isophoronediamine, menthanediamine, 1,4-bisaminopropylpiperadine, o-, m- or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m- or p-xylylenediamine, 1,5- or 2,6-naphthalenediamine, benzidine, 4,4'-bis(β-toluidine), dianisidine, 4,4'-diaminodiphenylmethane, 2,2-(4,4'-diaminodiphenyl)propane, 4,4'-diaminodiphenyl ether, 4,4'-thiodianilihne, 4,4'-diaminodiphenyl sulfone, 4,4'-diaminoditolyl sulfone, methylenebis(β-chloroaniline), 3,9-bis(3-aminopropyl)-2,4,8,10-tetraoxaspiro[5,5]undecane, diethylenetriamine, iminobispropylamine, methyliminobispropylamine, bis(hexamethylene) triamine, triethylenetetramine, tetraethylenepentamine, pentaethylenehexamine, N-aminoethylpiperadine, N-aminopropylpiperadine, 1,4-bis(aminoethylpiperadine), 1,4-bis(aminopropylpiperadine), 2,6-diaminopyridine and bis(3,4-diaminophenyl)sulfone; secondary amines such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, dialkylamine, pyrrolidine, piperidine, 2-, 3- or 4-picoline, 2,4-, 2,6- or 3,5-lupetidine, diphenylamine, N-methylaniline, N-ethylaniline, dibenzylamine, methylbenzylamine, dinaphthylamine, pyrrol, indoline, indole and morpholine; secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoptane, N,N'-diethylethylenediamine, N,N'-diethy l-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- or 2,6-dimethylpiperadine, homopiperadine, 1,1-di(4-piperidyl)methane, 1,2-di(4-piperidyl)ethane, 1,3-di(4-piperidyl)propane, 1,4-di(4-piperidyl)butane and tetramethylguanidine; tertiary amines such as trimethylamine, triethylamine, tri-n-propylamine, triisopropylamine, tri(1,2-dimethylpropyl)amine, tri(3-methoxypropyl)amine, tri-n-butylamine, triisobutylamine, tri-sec-butylamine, tri-n-pentylamine, tri-3-pentylamine, tri-n-hexylamine, tri-n-octylamine, tri(2-ethylhexyl)amine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine and 2-(2-dimethylaminoethoxy)-4-methyl-1,3,2-dioxabornane; tertiary polyamines such as tetramethylethylenediamine, pyrazine, N,N'-dimethylpiperadine, N,N'-bis(2-hydroxypropyl)piperadine, hexamethylenetetramine, N,N,N',N'-tetramethyl-1,3-butaneamine, 2-dimethylamino-2-hydroxy-propane, diethyaminoethanol, N,N,N-tris(3-dimethylaminopropyl)amine, 2,4,6-tris(N,N,-dimethylaminomethyl)phenol and heptamethylisobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl)methane, addition products of alkylimidazoles and isocyanuric acid and condensation products of alkylimidazoles and formaldehyde; and amidines such as 1,8-diazabicyclo[5.4.0]undecene-7,1,5-diazabicyclo[4.3.0]nonene-5,6-dibutylamino-1,8-diazabicyclo[5.4.0]undecene-7;

(2) Quaternary ammonium salts such as tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogensulfite, tetra-n-butylammonium tetrafluoroborate, tetra-n-butylammonium tetraphenylborate, tetra-n-butylammonium para-toluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, methyltriphenylammonium chloride, methyltriphenylammonium bromide, ethyltriphenylammonium chloride, ethyltriphenylammonium bromide, n-butyltriphenylammonium chloride, n-butyltriphenylammonium bromide, 1-methylpyridinium bromide, 1-ethylpyridinium bromide, 1-n-butylpyridmnium bromide, 1-n-hexylpyridinium bromide, 1-n-octylpyridinium bromide, 1-n-dodecylpyridinium bromide, 1-phenylpyridinium bromide, 1-methylpicodinium bromide, 1-ethylpicodnium bromide, 1-n-butylpicolinium bromide, 1-n-hexylpicolinium bromide, 1-n-octylpicolinium bromide, 1-n-dodecylpicolinium bromide and 1-phenylpicolinium bromide;

(3) Complexes of the amines described in (1) with borane and boron trifluoride;

(4) Phosphines such as trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl) phosphine, tris(4-methylphenyl)phosphine, tris (diethylamino)phosphine, tris(4-methylphenyl) phosphine, dimethylphenylphosphine, diethylphenylphosphine, dicyclohexyolphenylphosphine, ethyldiphenylphosphine, diphenylcyclohexylphosphine and chlorodiphenylphosphine;

(5) Quaternary phosphonium salts such as tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenylphosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, tetrakishydroxymethylphosphonium chloride, tetrakishydroxymethylphosphonium bromide, tetrakishydroxyethylphosphonium chloride and tetrakishydroxybutylphosphonium chloride;

(6) Sulfonium salts such as trimethylsulfonium bromide, triethylsulfonium bromide, tri-n-butylsulfonium chloride, tri-n-butylsulfonium bromide, tri-n-butylsulfonium iodide, tri-n-butylsulfonium tetrafluoroborate, tri-n-hexylsulfonium bromide, tri-n-octylsulfonium bromide, triphenylsulfonium chloride, triphenylsulfonium bromide and triphenylsulfonium iodide;

(7) Iodonium salts such as diphenyliodonium chloride, diphenyliodonium bromide and diphenyliodonium iodide;

(8) Mineral acids such as hydrochloric acid, sulfuric acid, nitric acid, phosphoric acid and carbonic acid, and half-esters of these mineral acids;

(9) Lewis acids such as boron trifluoride and boron trifluoride etherates;

(10) Organic acids and half-esters of organic acids;

(11) Silicic acids and tetrafluoroboric acid; and

(12) Tin compounds such as dibutyltin dilaurate, dibutyltin diacetate, dibutyltin dichloride, dimethyltin dichloride and tributyltin chloride.

Among these compounds, primary monoamines, secondary monoamines, tertiary monoamines, tertiary polyamines, imidazoles, amidines, quaternary ammonium salts, phosphines, quaternary phosphonium salts, tertiary sulfonium salts, secondary iodonium salts and tin compounds are preferable because these compounds cause little coloring of the cured products. These compounds may be used singly or in combination of two or more.

Although the amount of the curing catalyst to be used varies depending on the components of the composition, the mixing ratio of the components and the process of curing, and not strictly limited, the amount is generally 0.001 to 5 parts by weight, preferably 0.005 to 3 parts by weight, more preferably 0.01 to 1 part by weight and most preferably 0.01 to 0.5 part by weight per 100 parts by weight of the total amount of the composition. When the amount of the curing catalyst exceeds 5 parts by weight, the refractivity index and heat resistance of the cured product decrease and the cured product is colored. When the amount is less than 0.001 part by weight, the curing does not proceed sufficiently and heat resistance becomes insufficient.

To improve the dyeability of the resin obtained by curing the composition of the present invention by polymerization, a carboxylic acid, a mercaptocarboxylic acid, a hydroxycarboxylic acid, an amide, a 1,3-diketone, a 1,3-dicarboxylic acid, a 3-ketocarboxylic acid, an ester thereof or a compound having an unsaturated group may be used in combination as the component.

Examples of the carboxylic acid include formic acid, acetic acid, propionic acid, butyric acid, valeric acid, caproic acid, caprylic acid, methyl mercaptopropionate, oxalic acid, malonic acid, succinic acid, glutaric acid, adipic acid, cyclohexanecarboxylic acid, benzoic acid, o-toluic acid, m-toluic acid, p-toluic acid, 2-methoxybenzoic acid, 3-methoxybenzoic acid, phthalic acid, isophthalic acid, terephthalic acid, thiodipropionic acid and dithiodipropionic acid.

Examples of the mercaptocarboxylic acid include thioglycolic acid, 2-thiopropionic acid, 3-thiopropionic acid, thiolactic acid, mercaptosuccinic acid, thiomahc acid, N-(2-mercaptopropionyl)glycine, 2-mercaptobenzoic acid, 2-mercaptonicotinic acid, 3,3-dithioisobutyric acid, dithioglycolic acid, and dithiopropionic acid.

Examples of the hydroxycarboxylic acid include hydroxyacetic acid, α-hydroxypropionic acid, β-hydroxypropionic acid, α-hydroxybutyric acid, β-hydroxybutyric acid, γ-hydroxybutyric acid, salicylic acid, 3-hydroxybenzoic acid and 4-hydroxybenzoic acid.

Examples of the amide include formamide, N-methylformamide, acetamide, N-methylacetamide, phthalamide, isophthalamide, terephthalamide, benzamide, toluamide, 4-hydroxybenzamide and 3-hydroxybenz-amide.

Examples of the 1,3-diketone include acetylacetone and cyclohexane-1,3,5-trione.

Examples of the 1,3-dicarboxylic acid and the ester thereof include malonic acid, 2-methylmalonic acid and mono- and diesters thereof.

Examples of the 3-ketocarboxylic acid and the ester thereof include acetoacetic acid and esters thereof.

The compound having an unsaturated group may include alcohols, phenols, mercaptans, thiophenols, mercaptoalcohols, carboxylic acids and amides each having an unsaturated group.

Examples of the alcohols having an unsaturated group include monohydroxy compounds such as 2-hydroxyethyl methacrylate, 2-hydroxyethyl acrylate, 3-hydroxypropyl methacrylate, 3-hydroxypropyl acrylate, 2-hydroxypropyl methacrylate, 2-hydroxypropyl acrylate, 1,3-dimethacryloxy-2-propanol, 1,3-diacryloxy-2-propanol, 1-acryloxy-3-methacryloxy-2-propanol, pentaerythritol trimethacrylate, pentaerythritol triacrylate, bis(2,2,2-trimethylolethyl)ether pentamethacrylate, bis(2,2,2-trimethylolethyl)ether pentaacrylate, trimethylolpropane dimethacrylate, trimethylolpropane diacrylate, allyl alcohol, crotyl alcohol, methyl vinyl carbinol, cinnamyl alcohol, 4-vinylbenzyl alcohol, 3-vinylbenzyl alcohol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, 3-phenoxy-2-hydroxylpropyl acrylate, 2-hydroxyethyl isocyanurate bisacrylate, 2-hydroxyethyl isocyanurate bismethacrylate, 2-hydroxyethyl cyanurate bisacrylate, 2-hydroxyethyl cyanurate bismethacrylate, 3-methyl-1-butyn-3-ol, 3-methyl-1-pentyn-3-ol and propargyl alcohol; polyhydroxy compounds such as pentaerythritol dimethacrylate, pentaerythritol diacrylate, pentaerythritol monomethacrylate, pentaerythritol monoacrylate, trimethylolpropane monomethacrylate, trimethylolpropane monoacrylate, 2-hydroxyethyl isocyanurate monoacrylate, 2-hydroxyethyl isocyanurate monomethacrylate, 2-hydroxyethyl cyanurate monoacrylate and 2-hydroxyethyl cyanurate monomethacrylate; and unsaturated polyhydroxy compounds formed by the addition reaction of acrylic acid or methacrylic acid with epoxy compounds which are described later such as 2,2-bis[4-(2-hydroxy-3-methacryloxypropoxy)phenyl]propane.

Examples of the phenols having an unsaturated group include 2-vinylphenol, 3-vinylphenol and 4-vinylphenol.

Examples of the mercaptoalcohols having an unsaturated group include 2-(4-vinylbenzylthio)-2-mercaptoethanol and 2-(3-vinylbenzylthio)-2-mercaptoethanol.

Examples of the carboxylic acids having an unsaturated group include acrylic acid, methacrylic acid, crotonic acid, mono(hydroxyethyl acrylate) phthalate, maleic acid, fumaric acid, monoallyl phthalate and cinnamic acid.

Examples of the amides having an unsaturated group include amides of α,β-unsaturated carboxylic acids such as acrylic acid, methacrylic acid, maleic acid, maleic anhydride and fumaric acid; and N-vinylformamide.

The mercaptoalcohols, hydroxythiophenols and alcohols having an unsaturated group are preferred in view of obtaining a sufficient heat resistance.

The above compounds may be used singly or in combination of two or more in an amount of 0.001 to 40 parts by weight per 100 parts by weight of the composition of the present invention.

In addition to the dyeability-improving compound mentioned above, the composition of the present invention may be cured in the presence of a compound having two or more functional groups reactive with the structure represented by the formula (1); a compound having one or more functional groups reactive with the structure represented by the formula (1) and one or more other homopolymerizable functional groups; a compound having one or more homopolymerizable functional groups; or a compound having one homopolymerizable functional group which is also reactive with the structure represented by formula (1), usually in an amount of 0.001 to 40 parts by weight per 100 parts by weight of the composition.

Examples of the compound having two or more functional groups reactive with the structure represented by formula (1) include epoxy compounds, known episulfide compounds and anhydrides of polybasic carboxylic acids. Examples of the compound having one or more functional groups reactive with the structure represented by formula (1) and one or more other homopolymerizable functional groups include epoxy compounds, episulfide compounds and carboxylic acid anhydrides each having an unsaturated group such as methacryl group, acryl group, allyl group, vinyl group and aromatic vinyl group. Examples of the compound having one or more homopolymerizable functional group include compounds having an unsaturated group such as methacryl group, acryl group, allyl group, vinyl group and aromatic vinyl group.

Examples of the compound having two or more functional groups reactive with the structure represented by the formula (1) are:

Epoxy compounds including phenol epoxy compounds which are condensation products of epihalohydrins with polyhydric phenols such as hydroquinone, catechol, resorcinol, bisphenol A, bisphenol F, bisphenol sulfone, bisphenol ether, bisphenol sulfide, halogenated bisphenol A and novolak resins; alcohol epoxy compounds which are condensation products of epihalohydrins with polyhydric alcohols such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- or 1,4-cyclohexanediol, 1,3- or 1,4-cyclohexanedimethanol, hydrogenated bisphenol A, bisphenol A/ethylene oxide adducts and bisphenol A/propylene oxide adducts; glycidyl ester epoxy compounds which are condensation products of epihalohydrins with polybasic carboxylic acids such as adipic acid, sebacic acid, dodecandicarboxylic acid, dilner acid, phthalic acid, isophthalic acid, terephthalic acid, tetrahydrophthalic acid, methyltetrahydrophthalic acid, hexahydrophthalic acid, hexahydroisophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid; amine epoxy compounds which are condensation products of epihalohydrins with primary amines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl)ether, 1,2-bis(3-aminopropoxy)ethane, 1,3-bis(3-aminopropoxy)-2,2'-dimethylpropane, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, isophoronediamine, 1,4-bisaminopropylpiperadine, m- or p-phenylenediamine, 2,4- or 2,6-tolylenediamine, m- or p-xylylenediamine, 1,5- or 2,6-naphthalenediamine, 4,4'-diaminodiphenylmethane, 4,4'-diaminodiphenyl ether and 2,2-(4,4'-diaminodiphenyl)propane, or secondary amines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminoprop ane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- or 2,6-dimethylpiperadine, homopiperadine, 1,1-di(4-piperidyl)methane, 1,2-di(4-piperidyl)ethane, 1,3-di(4-piperidyl)propane and 1,4-di(4-piperidyl)butane; alicyclic epoxy compounds such as 3,4-epoxycyclohexyl-3,4-epoxycyclohexanecarboxylate, vinylcyclohexane dioxide, 2-(3,4-epoxycyclohexyl)-5,5-spiro-3,4-epoxycyclohexane-meta-dioxane and bis(3,4-epoxycyclohexyl)adipate; epoxy compounds produced by epoxidation of unsaturated compounds such as cyclopentadiene epoxide, epoxidized soy bean oil, epoxidized polybutadiene and vinylcyclohexene epoxide; and urethane epoxy compounds produced by the reaction between the polyhydric alcohols and phenols recited above with diisocyanates and glycidol;

Episulfide compound including compounds obtained by partially or entirely converting the epoxy groups in the above epoxy compounds into episulfide group; and Polybasic carboxylic acid anhydride including anhydrides of the acids described above as the compounds which provide the epoxy compounds by the condensation with epihalohydrins.

Examples of the compound having one or more functional groups reactive with the structure represented by formula (1) and one or more other homopolymerizable functional groups are epoxy compounds having an unsaturated group such as vinylphenyl glycidyl ether, vinylbenzyl glycidyl ether, glycidyl methacrylate, glycidyl acrylate and allyl glycidyl ether.

Examples of the compound having one or more homopolymerizable functional groups are:

Compounds having an ester structure derived from (meth) acrylic acid and a mono- or polyhydric alcohol, such as methyl acrylate, methyl methacrylate, ethyl acrylate, ethyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, polyethylene glycol diacrylate, polyethylene glycol dimethacrylate, 1,3-butylene glycol diacrylate, 1,3-butylene glycol dimethacrylate, 1,6-hexanediol diacrylate, 1,6-hexanediol dimethacrylate, neopentyl glycol diacrylate, neopentyl glycol dimethacrylate, polypropylene glycol diacrylate, polypropylene glycol dimethacrylate, 2,2-bis[4-(acryloxyethoxy)phenyl]propane, 2,2-bis[4-(methacryloxyethoxy)phenyl]propane, 2,2-bis[4-(acryloxy.diethoxy)phenyl]propane, 2,2-bis[4-(methacryloxy.diethoxy)phenyl]propane, 2,2-bis[4-(acryloxy.polyethoxy)phenyl]propane, 2,2-bis[4-(methacryloxy.polyethoxy)phenyl]propane, trimethylolpropane triacrylate, trimethylolpropane trimethacrylate, pentarythritol tetraacrylate, pentaerythritol tetramethacrylate, bis(2,2,2-trimethylolethyl)ether hexaacrylate and bis(2,2,2-trimethylolethyl)ether hexamethacrylate;

Allyl compounds such as allyl sulfide, diallyl phthalate and diethylene glycol bisallylcarbonate;

Viyl compounds such as acrolein, acrylonitrile and vinyl sulfide; and

Aromatic vinyl compounds such as styrene, α-methylstyrene, methylvinylbenzene, ethylvinylbenzene, α-chlorostyrene, chlorovinylbenzene, vinylbenzyl chloride, para-divinylbenzene and meta-divinylbenzene.

Examples of the compound having one homopolymerizable functional group which is also reactive with the structure represented by the formula (1) are preferably compounds having one epoxy group or episulfide group. Specific examples of such compounds are monoepoxy compounds such as ethylene oxide, propylene oxide and glycidol; glycidyl esters of monocarboxylic acids such as acetic acid, propionic acid and benzoic acid; glycidyl ethers such as methyl glycidyl ether, ethyl glycidyl ether, propyl glycidyl ether and butyl glycidyl ether; monoepisulfides such as ethylene sulfide and propylene sulfide; and thioglycidyl esters having a structure derived from the above monocarboxylic acids and thioglycidol (1,2-epithio-3-hydroxypropane). Among these compounds, compounds having one episulfide group are preferable.

The compound having two or more functional groups reactive with the structure represented by the formula (1), or the compound having one or more functional groups reactive with the structure represented by the formula (1) and one or more other homopolymerizable functional groups can be cured into a resin by the polymerization with the composition of the present invention in the presence of a curing catalyst. As the curing catalyst, the amines, the phosphines and the acids described above can be used.

When the composition of the present invention is cured by the polymerization with the compound having an unsaturated group, the polymerization is preferably conducted in the presence of a radical polymerization initiator as the polymerization accelerator. Any compound forming a radical by heating, ultraviolet light irradiation or electron beams irradiation, such as known heat polymerization catalysts and photopolymerization catalysts, can be used as the radical polymerization initiator. Examples of the heat polymerization catalysts are peroxides such as cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, tert-hexyl peroxyneodecanoate, tert-butyl peroxyneodecanoate, tert-hexyl peroxyneohexanoate, tert-butyl peroxyneohexanoate, 2,4-dichlorobenzoyl peroxide, benzoyl peroxide, dicumyl peroxide and di-tert-butyl peroxide; hydroperoxides such as cumene hydroperoxide and tert-butyl hydroperoxide; and azo compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methyl1butyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4trimethylpentane). Examples of the photopolymerization catalysts are benzophenone and benzoin benzoinmethyl ether. Among these compounds, peroxides, hydroperoxides and azo compounds are preferable and peroxides and azo compounds are more preferable. Most preferable examples include azo compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'- azobis(2-methylpropane) and 2,2'-azobis(2,4,4-trimethylpentane). The above compounds may be used singly or in combination of two or more. Although the amount of the radical polymerization initiator to be used varies depending on the components of the composition and the process for curing and is not strictly limited, the amount is preferably 0.01 to 5% by weight and more preferably 0.1 to 2% by weight based on the total amount of the composition.

To improve the practical properties of the optical materials being produced by polymerizing the composition of the present invention, the composition may be added with known additives such as antioxidants, ultraviolet light absorbents, anti-yellowing agents, bluing agents and pigments generally in an amount 0.0001 to 50 parts by weight based on 100 parts by weight of the composition. When the composition of the present invention is easy to release from molds during polymerization, it is effective to use or add known external and/or internal adhesion improvers, thereby controlling and improving the adhesion between the cured material being formed and the mold. Examples of the internal adhesion improver include silane compounds such as 3-methacryloxypropyltrimethoxysilane, 3-glycidoxypropyltrimethoxysilane, N-(2-aminoethyl)-3-aminopropyltrimethoxysilane and 3-mercaptopropyltrimethoxysilane. The internal adhesion improver can be used in an amount of 0.0001 to 5 parts by weight per 100 parts by weight of the composition of the present invention. On the other hand, when the composition of the present invention is difficult to release from molds after the polymerization, it is effective to use or add a known external or internal mold release agent, thereby improving the releasability of the cured material being formed from the molds. Examples of the internal mold release include non-ionic fluorine-containing surfactants, nonionic silicon-containing surfactants, quaternary alkylammonium salts, esters of phosphoric acid, acid esters of phosphoric acid, acid esters of phosphoric acid of oxyalkylene types, alkali metal salts of acid esters of phosphoric acid, alkali metal salts of oxyalkylene type acid ester of phosphoric acid, metal salts of higher fatty acids, esters of fatty acids, paraffin, wax, higher aliphatic amides, higher aliphatic alcohols, polysiloxanes and addition products of ethylene oxide and aliphatic amines.

The composition (the compound (a), compound (b) and compound (c)) of the present invention in combination with optional components such as the dyeability-improving agents, the curing catalysts and the unsaturated group-containing compounds reactive with the episulfide group such as glycidyl methacrylate and thioglycidyl methacrylate (a compound obtained by converting epoxy group of glycidyl methacrylate into episulfide group) is mixed with a radical polymerization initiator, a radical polymerizable monomer and other additives such as an adhesion improver, an antioxidant and an ultraviolet absorber. Then the resultant mixture is injected into a mold made of glass or metal and cured therein by heating. The cured product is then taken out of the mold to obtain a optical material such as lenses.

When any of the main starting compounds, i.e., the compound (a), the compound (b) and the compound (c), and the optional starting compounds such as the dyeability-improving agent, the compound having two or more functional groups reactive with the structure represented by the formula (1), the compound having one or more functional groups reactive with the structure represented by the formula (1) and one or more homopolymerizable functional groups, the compound having one or more homopolymerizable functional groups and the compound having one homopolymerizable functional group which is reactive with the structure represented by the formula (1) is homopolymerizable, an entire portion of a part of the homopolymerizable compound may be, singly or in combination with another copolymerizable main starting compound and/or another copolymerizable optional starting compound, pre-reacted in advance at −100 to 160° C. for 0.1 to 100 hours in the presence or the absence of a catalyst under or without stirring. The starting compound or compounds thus pre-reacted may be mixed with the other starting compounds to prepare a composition, which is then injected into a mold.

When the main starting compounds and the optional starting compounds being used are all non-homopolymerizable, or non-homopolymerizable and non-polymerizable with each other, a non-homopolymerizable starting compound may be pre-reacted in the same manner as above in combination with another in combination with another copolymerizable main starting compound and/or another copolymerizable optional starting compound.

The curing time is preferably 0.1 to 200 hours and more preferably 1 to 100 hours. The curing temperature is preferably −10 to 160° C. and more preferably −10 to 140° C. The polymerization can be conducted by suitably combining a step of holding the temperature at a specific polymerization temperature for a specific period of time, a step of increasing the temperature at a speed of 0.1 to 100° C./hour and a step of decreasing the temperature at a speed of 0.1 to 100° C./hour. To remove strains from the optical material of the present invention, the material obtained after the curing is preferably annealed at 50 to 150° C. for about 10 minutes to 5 hours. Where necessary, the obtained optical material may be subjected to treatments for dyeing, hard coat formation, reflection prevention and clouding prevention.

As described above, the main starting compounds, optional starting compounds and optional additives are mixed together and the obtained mixture is injected into a mold and cured therein. The main starting materials, i.e., the compound (a), compound (b), and compound (c), the optional starting materials, i.e., the dyeability-improving agent, the compound having two or more functional groups reactive with the structure represented by the formula (1), the compound having one or more functional groups reactive with the structure represented by the formula (1) and one or more homopolymerizable functional groups, the compound having one or more homopolymerizable groups and the compound having one homopolymerizable functional group which is reactive with the structure represented by the formula (1), and optional additives such as the antioxidants, the curing catalysts, the radical initiators, the adhesion improvers, the stabilizers, etc. may be mixed together in the same vessel at the same time. Alternatively, the above starting materials and additives may be mixed by adding successively. Separate mixtures of the starting materials and additives may be mixed together in the same vessel. The main starting materials, the optional starting materials and additives may be mixed in any order. In general, the mixing temperature and the mixing time are not limited as long as the components can be sufficiently mixed together. However, an excessively high temperature and an excessively long time are not preferable because undesirable reactions take place between the components to increase viscosity and the operation of casting becomes difficult. Therefore, the mixing temperature is about −20 to 100° C., preferably −10 to 50° C. and more preferably −5 to 30° C. The mixing time is 1 minute to 5 hours, preferably 5 minutes to 2 hours, more preferably 5 to 30 minutes and most preferably about 5 to 15 minutes. The materials and the additives are preferably subjected to degassing under vacuum before, during or after mixing to prevent formation of bubbles during curing in the mold. The vacuum degree of the degassing is 0.1 to 700 mmHg and preferably 10 to 300 mmHg. To obtain a better quality of the optical material of the present invention, it is preferable to remove impurities by filtration through a microfilter having a pore diameter of about 0.1 to 5 μm or the like before the injection into the mold.

The optical material obtained by curing the composition of the present invention by polymerization exhibits an excellent balance between a sufficiently high refractive index (1.65 or higher) and an excellent Abbe's number (30 or higher) and can achieve a high impact resistance as high as about 2.0 J without adverse effects on heat resistance and oxidation resistance.

The present invention will be explained in more detail by reference to the following example which should not be construed to limit the scope of the present invention. The polymers were evaluated by the following methods.

Refractivity index (nD) and Abbe's number (vD):

Measured at 25° C. using an Abbe's refractometer

Impact resistance:

Iron balls were dropped to a flat polymer plate having a thickness of 2.5 mm from the height of 127 cm while changing increasing the weight of the ball with an increment of 10 g, starting from 10 g until the plate was broken. The impact resistance was expressed as the impact energy required to break the plate.

EXAMPLE 1

To 100 parts by weight of a mixture containing 88 parts by weight of bis(β-epithiopropyl)sulfide as the compound (a), 4 parts by weight of 1,3-bis(isocyanatomethyl) cyclohexane as the compound (b) and 8 parts by weight of bis(2-mercaptoethyl) sulfide as the compound (c), 0.1 part by weight of tetrabutylphosphonium bromide as the catalyst, 0.1 part by weight of 2,6-di-tert-butyl-4-methylphenol as the antioxidant and 0.1 part by weight of 2-(2-hydroxy-5-tert-octylphenyl)benzotriazole as the ultraviolet light absorber were mixed and stirred at a room temperature to obtain a homogeneous liquid. The obtained homogeneous liquid was injected into a mold for a lens and cured by polymerization under heating while the temperature was raised from 10° C. to 120° C. over 22 hours in an oven, thereby preparing a lens. The obtained lens had a large impact resistance, showed excellent tone, dyeability, heat resistance and oxidation resistance. The lens not only had excellent optical properties and physical properties but also showed an excellent surface condition with little striae or surface deformation. The properties of the prepared lens are shown in Table 1.

EXAMPLES 2 to 26

The same procedures as in Example 1 were repeated except that the formulation was changed as shown in Table 1 and the catalyst shown in Table 1 was used. The results are shown in Table 1.

In all cases, the prepared lens had a large impact resistance and showed excellent tone, dyeability, heat resistance and oxidation resistance. The lens not only had excellent optical properties and physical properties but also showed an excellent surface condition with little striae or surface deformation. The properties of the prepared lens are shown in Table 1.

COMPARATIVE EXAMPLES 1 TO 7

The same procedures as in Example 1 were repeated except that the formulation was changed as shown in Table 1 and the catalyst shown in Table 1 was used. The results are shown in Table 1.

The impact resistance was poor because the amount ratio of the compounds (a), (b) and (c) were outside the ranges of the present invention.

COMPARATIVE EXAMPLE 8

The same procedures as in Example 1 were conducted except that the formulation was changed as shown in Table 1 and the catalyst shown in Table 1 was used. The results are shown in Table 1.

The impact resistance was poor and an excellent balance between a sufficiently high refractive index and an excellent Abbe's number could not be achieved because the amount ratio of the compounds (a), (b) and (c) were outside the ranges of the present invention.

TABLE 1

| | Formulation (parts by weight) | | | |
|---|---|---|---|---|
| | (a) | (b) | (c) | catalyst |
| Example 1 | BES (88) | BIC (4) | BMES (8) | TBPB (0.1) |
| Example 2 | BES (65) | BIC (10) | BMES (25) | TBPB (0.1) |
| Example 3 | BES (50) | BIC (15) | BMES (35) | TBPB (0.1) BTA (0.01) |
| Example 4 | BES (85) | LTI (5) | BMES (10) | TBPB (0.1) |
| Example 5 | BES (82) | XDI (5) | DMMD (13) | TBPB (0.1) |
| Example 6 | BES (70) | XDI (9) | DMMD (21) | TBPB (0.1) |
| Example 7 | BES (75) | XDIT (10) | PETMA (15) | TBPB (0.1) |
| Example 8 | BESe (80) | XDI (8) | DMMD (12) | TBPB (0.1) |
| Example 9 | BESe (60) | XDI (15) | BMES (25) | TBPB (0.1) |
| Example 10 | BESe (80) | NBDI (5) | DMMD (15) | TBPB (0.1) |
| Example 11 | BESe (60) | NBDI (5) | PETMA (35) | TBPB (0.1) BTA (0.01) |
| Example 12 | BESe (70) | IPDI (1) | BMES (29) | TBPB (0.1) |
| Example 13 | BED (90) | H12MDI (3) | BTG (7) | TPP (1.0) |
| Example 14 | BED (45) | IPDI (5) | DMMD (50) | TPP (1.0) |
| Example 15 | BED (40) | BIC (30) | DMMD (30) | TPP (1.0) BTA (0.01) |
| Example 16 | BED (50) | H12MDI (40) | PETMA (10) | TPP (1.0) BTA (0.01) |
| Example 17 | BED (70) | H12MDI (15) | PETMA (15) | TPP (1.0) |
| Example 18 | BED (80) | XDI (19) | BTG (1) | TPP (1.0) |
| Example 19 | BDS (70) | H12MDI (20) | PETMA (10) | TPP (1.0) |
| Example 20 | BDS (50) | BIC (30) | PETMA (20) | TPP (1.0) BTA (0.01) |
| Example 21 | BDS (30) | IPDI (40) | PETMA (30) | TPP (1.0) BTA (0.01) |
| Example 22 | BDS (80) | HMDI (15) | BTG (5) | TPP (1.0) |
| Example 23 | TEPP (95) | NBDI (2) | BMES (3) | TBPB (0.1) |
| Example 24 | TEPP (50) | XDIT (25) | DMMD (25) | TBPB (0.1) |
| Example 25 | TEPP (30) | IPDI (20) | BMES (50) | TBPB (0.1) BTA (0.01) |
| Example 26 | TEPP (72) | LTI (3) | BMES (25) | TBPB (0.1) |
| Comparative Example 1 | BES (100) | — | — | TBPB (0.1) |
| Comparative Example 2 | BED (100) | — | — | TPP (1.0) |
| Comparative Example 3 | BDS (100) | — | — | TPP (1.0) |
| Comparative Example 4 | BESe (100) | — | — | TBPB (0.1) |
| Comparative Example 5 | TEPP (100) | — | — | TBPB (0.1) |
| Comparative Example 6 | BES (97) | XDI (3) | — | TBPB (0.1) |
| Comparative Example 7 | BES (97) | — | BMES (3) | TBPB (0.1) |
| Comparative Example 8 | BDS (20) | XDI (40) | DMMD (40) | TBPB (0.1) BTA (0.01) |

TABLE 1-continued

| | Refractive index nD | Abbe's number vD | Impact resistance (J) |
|---|---|---|---|
| Example 1 | 1.70 | 36 | 3.2 |
| Example 2 | 1.67 | 36 | 3.0 |
| Example 3 | 1.66 | 36 | 2.5 |
| Example 4 | 1.70 | 36 | 3.1 |
| Example 5 | 1.70 | 36 | 3.3 |
| Example 6 | 1.69 | 35 | 3.5 |
| Example 7 | 1.70 | 35 | 3.3 |
| Example 8 | 1.72 | 32 | 3.2 |
| Example 9 | 1.68 | 30 | 3.1 |
| Example 10 | 1.72 | 33 | 3.1 |
| Example 11 | 1.69 | 33 | 2.6 |
| Example 12 | 1.71 | 33 | 2.5 |
| Example 13 | 1.73 | 33 | 3.1 |
| Example 14 | 1.71 | 33 | 2.2 |
| Example 15 | 1.67 | 33 | 2.2 |
| Example 16 | 1.66 | 33 | 2.2 |
| Example 17 | 1.70 | 33 | 3.0 |
| Example 18 | 1.71 | 31 | 2.5 |
| Example 19 | 1.71 | 31 | 2.8 |
| Example 20 | 1.70 | 30 | 2.3 |
| Example 21 | 1.68 | 30 | 2.2 |
| Example 22 | 1.70 | 31 | 3.3 |
| Example 23 | 1.69 | 36 | 2.7 |
| Example 24 | 1.71 | 34 | 2.6 |
| Example 25 | 1.67 | 36 | 2.2 |
| Example 26 | 1.70 | 36 | 3.2 |
| Comparative Example 1 | 1.71 | 36 | 1.6 |
| Comparative Example 2 | 1.73 | 33 | 1.6 |
| Comparative Example 3 | 1.74 | 31 | 1.5 |
| Comparative Example 4 | 1.73 | 33 | 1.2 |
| Comparative Example 5 | 1.70 | 36 | 1.3 |
| Comparative Example 6 | 1.71 | 36 | 1.6 |
| Comparative Example 7 | 1.71 | 36 | 1.6 |
| Comparative Example 8 | 1.63 | 30 | 1.8 |

Notes:
BES: bis(β-epithiopropyl)sulfide
BESe: bis(β-epithiopropyl)selenide
BED: bis(β-epithiopropyl)disulfide
BDS: bis(β-epidithiopropyl)sulfide
TEPP: 1,2,3-tris(β-epithiopropylthio)propane
XDI: m-xylylene diisocyanate
BIC: 1,3-bis(isocyanatomethyl)cyclohexane
IPDI: isophorone diisocyanate
H12MDI: dicyclohexylmethane 4,4'-diisocyanate
HMDI: hexamethylene diisocyanate
LTI: lysin triisocyanate
NBDI: 2,5-diisocyanatomethylnorbornene
XDIT: m-xylylene diisothiocyanate
BTG: n-butyl thioglycolate
BMES: bis(2-mercaptoethyl)sulfide
DMMD: 2,5-dimercaptomethyl-1,4-dithiane
PETMA: pentaerythritol tetramercaptoacetate
TBPB: tetra-n-buylphosphonium bromide
TPP: triphenylphosphine
BTA: di-n-buyltin diacetate

What is claimed is:
1. A composition comprising:
   (a) 30 to 95% by weight of a compound having, in one molecule, one or more structures represented by the following formula (1):

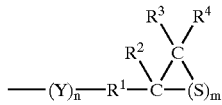
(1)

wherein $R^1$ is a single bond or a divalent hydrocarbon group having 1 to 10 carbon atoms, $R^2$, $R^3$ and $R^4$ are each hydrogen or a hydrocarbon group having 1 to 10 carbon atoms, Y is O, S, Se or Te, m is an integer of 1 to 5 and n is an integer of 0 to 5;
   (b) 1 to 40% by weight of a compound having at least one group selected from the group consisting of isocyanate group and isothiocyanate group in one molecule; and
   (c) 1 to 50% by weight of a compound having at least one mercapto group in one molecule,
   the weight percentages of the compounds (a), (b) and (c) being selected from the respective weight percentage ranges so that the total of the weight percentages of the compounds (a), (b) and (c) adds up to 100% by weight.
2. The composition according to claim 1, wherein the compound (b) is an aromatic or alicyclic compound having two or more isocyanate groups.
3. The composition according to claim 1, wherein the compound (b) is an aromatic diisocyanate or an alicyclic diisocyanate.
4. The composition according to claim 1, wherein the compound (c) is a compound having at least two mercapto groups in one molecule and having a sulfur atom as a sulfide group.
5. The composition according to claim 1, wherein the compound (c) is a compound represented by the following formula:

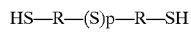

wherein p is 1 or 2 and two R groups may be the same or different and each an alkylene group having 1 to 10 carbon atoms.
6. The composition according to claim 1, wherein the compound (c) is a polythiol compound having a sulfur-containing ring structure.
7. A resin produced by curing the composition according to claim 1 by polymerization.
8. An optical material produced by curing the composition according to claim 1 by polymerization.
9. A method for producing a resin comprising a step of curing the composition according to claim 1 by polymerization.
10. The method according to claim 9, wherein the step of curing is carried out in the presence of a curing catalyst under heating.
11. The method according to claim 10, wherein the step of curing is carried out at −10 to 160° C. for 0.1 to 200 hours.
12. The method according to claim 9, wherein the step of curing is carried out in the presence of a compound selected from the group consisting of a compound having two or more functional groups reactive with a structure represented by the following formula (1):

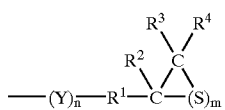
(1)

wherein $R^1$ is a single bond or a divalent hydrocarbon group having 1 to 10 carbon atoms, $R^2$, $R^3$ and $R^4$ are each hydrogen or a hydrocarbon group having 1 to 10 carbon atoms, Y is O, S, Se or Te, m is an integer of 1 to 5 and n is an integer of 0 to 5; a compound having one or more functional groups reactive with the structure represented by the formula (I) and one or more homopolymerizable functional groups; a compound having one or more homopolymerizable functional groups; and a compound having one homopolymerizable functional group which is also reactive with the structure represented by the formula (1).

* * * * *